United States Patent [19]

Berglund et al.

[11] 4,262,330
[45] Apr. 14, 1981

[54] I-PHASE CONTROLS FOR A COMPUTER

[75] Inventors: Neil C. Berglund, Kasson; Richard D. Crowley, Mazeppa; William G. Kempke; William C. Richardson, both of Rochester, all of Minn.

[73] Assignee: International Business Machines Corporation, Armonk, N.Y.

[21] Appl. No.: 954,069

[22] Filed: Oct. 23, 1978

[51] Int. Cl.³ .............................................. G06F 9/06
[52] U.S. Cl. ................................................... 364/200
[58] Field of Search .............................. 364/200, 900

[56] References Cited

U.S. PATENT DOCUMENTS

| | | | |
|---|---|---|---|
| 3,725,868 | 4/1973 | Malmer, Jr. et al. | 364/200 |
| 3,736,563 | 5/1973 | Beckinger et al. | 364/200 |
| 3,930,236 | 12/1975 | Ferguson et al. | 364/200 |
| 3,991,404 | 11/1976 | Brioschi et al. | 364/200 |
| 4,008,462 | 2/1977 | Kanda | 364/200 |
| 4,034,345 | 7/1977 | Deis | 364/200 |
| 4,038,643 | 7/1977 | Kim | 364/200 |
| 4,050,058 | 9/1977 | Garlic | 364/200 |
| 4,075,687 | 2/1978 | Wailach, et al. | 364/200 |
| 4,080,648 | 3/1978 | Asano, et al. | 364/200 |

OTHER PUBLICATIONS

Technical Newsletter IBM 3033 Processor Complex Theory of Operation/Diagrams Manual (vol. 1) SN22-4195; 12-11-78.
3033 Processor Complex Theory of Operations/Diagrams Manual (vol. 1) SY22-7001-0; 1978.
3033 Processor Complex Theory of Operation/Diagrams Manual (vol. 2) SY22-7002-0; 1978.
Technical Newsletter, System/370 Model 155 Theory of Operation/Diagram Manual SY22-6905; 2/1/72.
Technical Newsletter, System/370 Model 155 Theory of Operation/Diagram Manual SY22-6973; 1/3/74.
Technical Newsletter, IBM System/370 Model 158 Maintenance/Diagrams Manual SN22-5007; 6/1/78.
Technical Newsletter, IBM System/370 Model 168 Theory of Operation/Diagrams Manual (vol. 1) SN22-4165; 4/14/78.
Technical Newsletter, IBM System/370 Model 168 Theory of Operation/Diagrams Manual (vol. 2) SN22-4166; 4/14/78.
Technical Newsletter, IBM 3033 Processor Complex Theory of Operation/Diagrams Manual SN22-4176; 8/30/78.
System/370 Model 155 Theory of Operation/Diagram Manual SY22-6860-2; 1971.
System/370 Model 158 Maintenance/Diagrams Manual; 1978.
System/370 Model 168 Theory of Operation/Diagrams Manual (vol. 1) Introduction ST22-6931-3; 1976.
System/370 Model 168 Theory of Operation/Diagrams Manual (vol. 2) SY22-6932-4; 1976.

Primary Examiner—Edward J. Wise

[57] ABSTRACT

A control system for a computer includes a control store (30) for storing end op, I-1, I-2 and return words. A microinstruction decode and control unit (170) responds to end op words to initialize and personalize computer components to facilitate subsequent execution of a high level instruction. The control unit (170), in conjunction with a next address logic (162), selects the next microinstruction to be executed in response to a high level instruction. The control unit (170) and logic (162) are responsive to I-1 words to personalize the computer and to select a microinstruction to begin E-phase of a high level instruction. In response to I-2 control words, the control unit (170) and logic (162) select an operand fetch routine in the control store (30), and write a first E-phase address into a local store (138). The return word gates the first E-phase address from the local store (138) to select a microinstruction in the control store (3) to being E-phase.

27 Claims, 5 Drawing Figures

I-PHASE CONTROLS FOR A COMPUTER

DESCRIPTION

1. Technical Field

The present invention relates to digital computers, and particularly relates to a control system for use in a computer during instruction fetch or I-phase of instruction.

2. BACKGROUND ART

Most conventional computers have an architected user interface with a well-defined high level instruction set that the user can choose from to write programs for various applications. These programs are assembled and eventually loaded into a main store, and in response to commands from a processor, the high level instructions are fetched from the main store and transmitted to an instruction buffer for subsequent execution in the processor. To execute the high level instructions, the processor must gate data from the instruction buffer, decode the instructions and perform various preliminary operations. This first portion of high level instruction execution is commonly referred to as the instruction fetch, the I-phase or the I-fetch portion of the instruction. After I-phase, the specific arithmetic or logical operation called for by the high level instruction is performed. This later portion of instruction execution is commonly referred to as the execution or E-phase portion of an instruction. The process of fetching the instruction and performing the I-phase and E-phase is repeated for each high level instruction in main store.

The design of an I-fetch control system for controlling processor operations during I-phase is highly dependent upon the type and format of high level instructions to be executed in the processor. During the course of the development and refinement of a new computer, the number, type and format of the high level instructions will probably be changed to enhance certain operations and improve performance of the computer. Therefore, an I-fetch control system should be flexible to accommodate newly defined or changed high level instructions.

Each high level instruction will specify a mathematical or logical operation to be performed and the location of the operands with which the operation will be performed. The format of the instructions will vary. Some instruction formats will specify one operand while others will specify two operands. Different length operands may be specified by different instruction formats. Some instruction formats will specify operand addresses in main store while other instructions use data already stored in processor registers. Also, different operand checking will be required for different instructions to determine if operands are aligned properly, cross memory boundaries or to determine if invalid data has been supplied. The different formats and types of instructions make it difficult or inefficient for instructions to share processor execution routines.

Generally, the expense of a computer is proportional to the number of processor routines that are required to implement the high level instructions. A computer design allowing many different instructions to share the same processor routines would reduce the cost of the computer. Conventional computer designs attempt to classify high level instructions according to format with instructions of a particular class sharing processor routines. This conventional design has proved adequate for existing computers, but such design is lacking in flexibility for allowing changes in the number and definition of the high level instructions. For instance, in conventional computers using this design type, it is known that newly defined instructions have been placed of necessity in the wrong classification. When this misclassified newly defined instruction is executed, unnecessary microprocessor steps may be performed.

Thus, a need has arisen for a control system for a computer that is flexible to accommodate newly defined high level instructions, provides for sharing of processor routines, and yet provides for fast execution of high level instructions. In particular, a need has a risen for an I-fetch control system for controlling a processor during I-phase operation that provides for programming flexibility, efficient use of processor routines and fast execution of high level instructions.

DISCLOSURE OF INVENTION

The present invention solves the foregoing and other problems associated with conventional computers by the provision of an improved I-fetch control system that initializes and personalizes a computer to facilitate execution of a high level instruction. The I-fetch control system initializes the computer by placing processor components in a known condition so that control words of subsequent computer routines are not needed to perform this function. Personalizing the computer constitutes loading data into various hardware components to place these components in states which prepare the computer for executing any high level instruction. Personalization is performed to prepare the computer for executing routines that are required by the particular high level instruction which is presently being executed.

In accordance with one embodiment of the present invention, a control system selectively controls a computer in response to high level instructions that are programmed into the computer by a user and that specify an operation to be performed by the computer. The control system comprises a control store and logic. The control store holds a plurality of control instructions and selectively produces a first control instruction to begin execution of a high level instruction. The logic is responsive to the first control instruction to initialize and personalize the computer.

In accordance with another aspect of the invention, a control system selectively controls a computer in response to high level instructions that are programmed into the computer by a user. The high level instructions are chosen from a known set of instructions, with each high level instruction specifying one of a known set of operations. The control system comprises a control store and logic. The control store holds a plurality of control instructions and selectively produces ones of said control instructions for use in executing the high level instruction. A separate control instruction corresponds to each of the operations that may be specified by the high level instructions. The logic controls the flow of information through the computer and causes a branch to select a control instruction in the control store that corresponds to the arithmetic operation specified by a particular high level instruction presently executing in the computer. The selected control instruction is produced by the control store, and the logic is responsive thereto to place the computer in a personalized condition to facilitate the execution of the particular high level instruction.

In accordance with another aspect of the invention, the computer includes a plurality of registers for storing data. In response to the selected control instruction which corresponds to the operation specified by the particular high level instruction presently executing, the logic loads data into the registers to place the computer in a personalized condition to facilitate the execution of the particular high level instruction.

In accordance with another aspect of the invention, a local store is included in the computer for storing data, and the control store contains a plurality of operand fetch routines that are stored within the control store at spaced apart memory locations. In response to the selected control word, the logic loads an E-phase address into the local store and causes a branch to select one of the plurality of operand fetch routines in the control store for execution in the computer. After the complete execution of the selected operand fetch routine, the logic retrieves the E-phase address from the local store and uses the E-phase address to select the first control instruction for performing the operation specified by the particular high level instruction presently executing.

BRIEF DESCRIPTION OF THE DRAWINGS

The advantages and further aspects of the present invention may be best appreciated by those of ordinary skill in the art by reference to the following detailed description taken in conjunction with the accompanying drawings, in which.

DETAILED DESCRIPTION OF THE DRAWINGS

Figure 1:
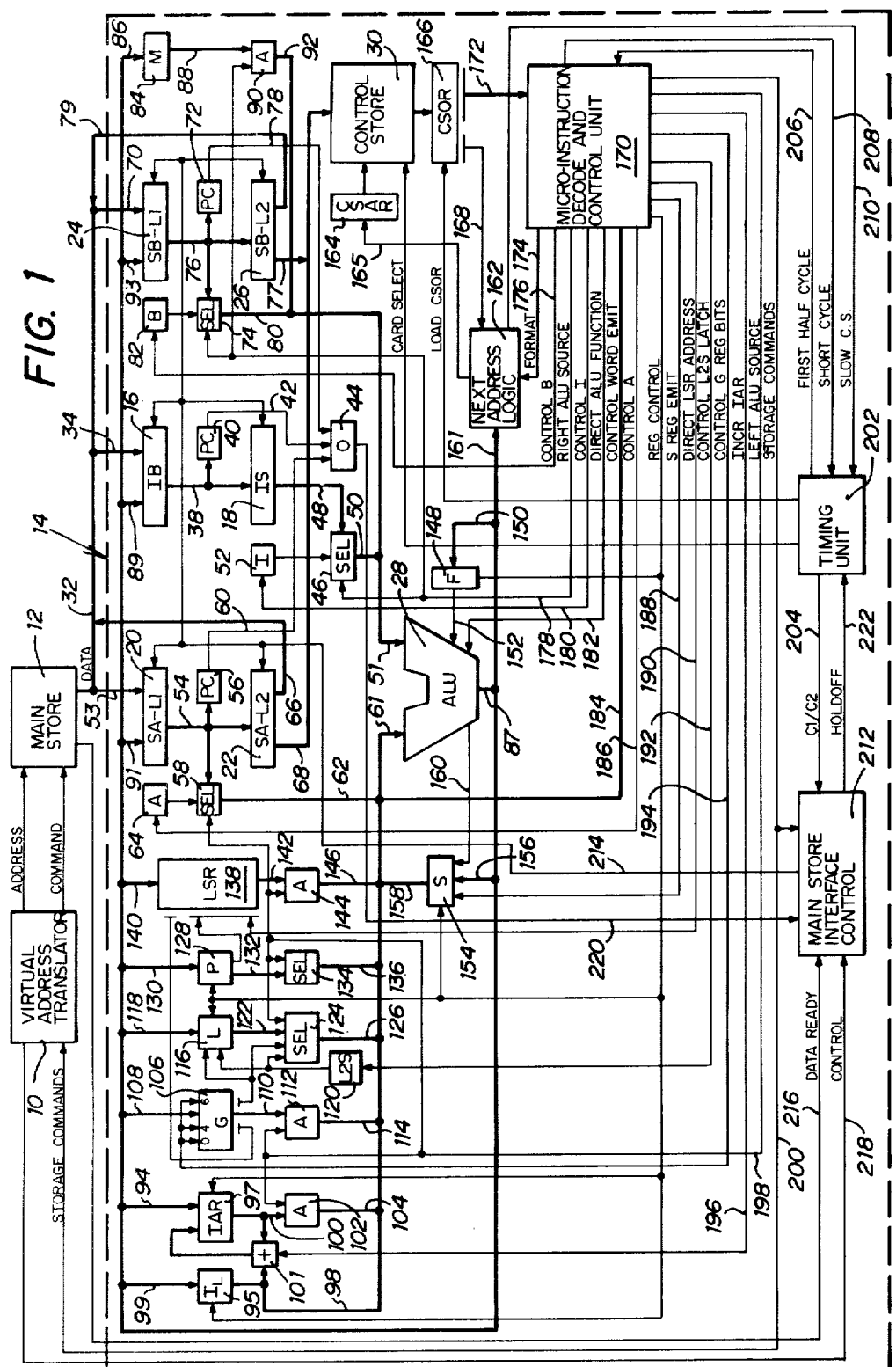
FIG. 1 is a diagram of a computer illustrating a control system embodying the present invention.

Referring now to the drawings in which like reference characters designate like or corresponding parts throughout the several views, there is shown in FIG. 1 a diagram of a computer embodying the present invention. The computer shown in FIG. 1 includes a virtual address translator 10, a main store 12 and a microprocessor 14. Access to the main store 12 is slower in operation than the microprocessor 14. Also, the main store 12 is dynamic such that the main store will lose its memory over a period of time and must be periodically refreshed. Main store 12 operates asynchronously with microprocessor 14.

In normal operation, the program provides high level instructions, sometimes referred to as macroinstructions, and other data such as operands which are stored in the main store 12. The high level instructions and operands are fetched from the main store in response to commands from the microprocessor 14, and the high level instructions are executed in the microprocessor. Commands or other data are transmitted from the microprocessor 14 to the main store 12 through the virtual address translator 10. The primary function of the virtual address translator 10 is to translate the virtual addresses received from the microprocessor 14 into real addresses for use in assessing data in the main store 12.

Execution of the high level instructions occurs in the microprocessor in two phases commonly referred to as an I-phase and an E-phase. The I-phase occurs immediately prior to the E-phase. During the I-phase, the microprocessor executes a plurality of microinstructions to prepare the microprocessor for performing a mathematical or logical operation specified by the high level instruction. For instance, if the high level instruction contains one or more storage operands, these operands are fetched from main store 12 and transferred to the microprocessor 14 in I-phase of execution. During the E-phase, an arithmetic or logical operation is performed on the operands as specified by the high level instruction.

The microprocessor 14 includes registers 16 and 18 for receiving high level instructions. Instruction buffer (IB) register 16 receives high level instructions and transfers them in a parallel shift to instruction stream (IS) register 18. Registers 20, 22, 24 and 26 receive operands from the main store 12. These registers 16, 18, 20, 22, 24 and 26 function as buffers temporarily holding information for subsequent use in the microprocessor. Buffers are needed to permit faster operation of the microprocessor 14 relative to operation of the main store 12. The operands are gated to an arithmetic logic unit 28 (hereinafter ALU 28) for the performance of an arithmetic or logical operation specified by the high level instruction. The execution of the high level instructions in the microprocessor 14 and the general operation of the microprocessor is primarily controlled by microinstructions stored in the control store 30.

It will be appreciated that FIG. 1 is somewhat diagrammatical and is intended to present an overview of the computer in order to aid a full understanding of the present invention. For clarity of illustration, certain communication paths are represented by heavy bold lines to indicate that these paths carry data directly corresponding to information received from the main store. Thus, the heavy bold lines may carry certain fields of data from the operands or the high level instructions or may carry the results of an arithmetic operation performed on the operands. The narrow light lines between the computer components represent control lines that carry control signals to control the operation of the microprocessor 14. Hereinafter, the heavy bold lines will be referred to as data paths, and the narrow light lines will be referred to as control lines. It will also be understood that single data paths and single control lines may indicate the presence of one or more actual conductors.

Referring now to the main store 12, a main data path 32 is connected to the main store and represents the data path through which information is transmitted to the microprocessor 14. The IB register 16, a 36-bit (32 data bits plus four parity bits) instruction backup register, receives high level instructions from the main store 12 through a data path 34. Data from the IB register 16 is selectively switched or transferred through data path 38 to the IS register 18 which is a 36-bit instruction stream register. Registers 16 and 18 function as a buffer for receiving the high level instructions from the main store 12. The data output of the IB register is also applied through the data path 38 to a parity check circuit 40 which detects errors in the information received by the IB register 16. If an error is detected, the parity check circuit 40 applies an error signal through a control line 42 to an OR gate 44.

The instruction stream register 18 is connected to a selector 46 by a data path 48. In response to control signals, the selector 46 selects an 8-bit field of data stored in the IS register 18 and applies the data through a data path 50 to the right input 51 of the ALU 28. Since the ALU 28 can only process one or two bytes at a time, it is necessary to select a one or two byte field from the IS register 18 for processing in the ALU 28. The data field selected by the selector 46 is controlled by a 2-bit I register 52 that counts from zero to three. The output of the I register 52 is applied to the selector 46 to specify and control which of the bytes or halfwords of the IS Register 18 will be selected and gated to the ALU 28 through the data path 50.

Since high level instructions may be 2, 4 or 6 bytes in length, the IS register 18 may not be large enough to contain the entire high level instruction. Thus, the IB register 16 is provided to contain high level instructions for subsequent shifting into the IS register 18. The IS register 18, in combination with the IR register 16, appears as it if were an 8-byte register to the remaining components of the microprocessor 14.

The SA-L1 register 20 and SA-L2 register 22 are shown in FIG. 1 to the left of the registers 16 and 18. The registers 20 and 22 are both 36-bit 32 data bits plus four parity bits storage register whose primary purpose is to buffer data such as operands from main store 12. Operands are applied through data path 53 to the input of register 20. The output of register 20 is connected by a data path 54 to a parity check circuit 56, the SA-L2 register 22, and a selector 58. The parity check circuit 56 detects erroneous data in the register 20 and selectively applies an error signal through a control line 60 to the OR gate 44. The selector 58 is operable to gate one of four bytes of data stored in the register 20 to a left input 61 of the ALU 28 through a data path 62. The selector 58 functions in a manner similar to the selector 46, previously described. A 2-bit A register 64 counts from zero to three to select which one of the bytes or halfwords stored in the register 20 will be gated to the left input 61.

The data stored in the SA-L2 register 22 may be shifted to the main store 12 through a data path 66. Also, the data stored in register 22 may be applied through a data path 68 to the control store 30. In this configuration, microinstructions or other data may be stored in the main store 12 and transferred through the registers 20 and 22 to the control store 30. Thus, infrequently used microinstructions may be stored in main store 12 and transferred to the control store 30 for occasional use in the microprocessor 14.

The SB-L1 register 24 and SB-L2 register 26 are located to the right of the instruction registers 16 and 18 in FIG. 1. Registers 24 and 26 are also 36-bit (32 data bits plus four parity bits) registers and perform a function similar to the registers 20 and 22, respectively. Operands and data may be transferred from the main store 12 to the SB-L1 register 24 through a data path 70. The output of register 24 is connected to a parity check circuit 72, the SB-L2 register 26, and a selector 74 by a data path 76. The parity check circuit 72 is substantially similar to the parity check circuits 40 and 56. Parity check circuit 72 detects erroneous information in the register 24 and produces an error signal on control line 78 which is connected to an input of the OR gate 44.

The selector 74 functions in a manner similar to the selectors 46 and 58. The selector 74 selects one of four bytes of data stored in the SB-L1 register 24 and gates the selected byte to the right ALU input 51 through a data path 80. A 2-bit B register 82 counts from zero to three with the output of the B register 82 connected to the selector 74 to determine which of the four bytes of data in the register 24 is gated to the ALU 28.

The SB-L2 register 26 is similar in function to the SA-L2 register 22. The output of the SB-L2 register 26 is applied through a data path 77 to the control store 30 and through a data path 79 to the main store 12.

An M register 84 is shown in FIG. 1 to the right of registers 24 and 26. M register 84 is a general purpose 16-bit work register having its input connected by data path 86 to the output 87 of the ALU 28. The output of the M register 84 is connected through a data path 88 to an AND circuit 90 that represents 16 individual AND gates, one of each bit of the M register 84. The AND circuit 90 selectively gates the output of the M register 84 through a data path 92 to the right ALU input 51. Thus, the M register 84 may be used as both a source and a destination for the ALU 28. One use for the M register 84 during I-phase is to hold data necessary to calculate the address in the main store 12 of one end of an operand field.

The registers 16, 20 and 24 are also connected to the ALU output 87. The IB register 16 may receive data from the ALU 28 through a data path 89, and data from the IB register may be transferred to the right ALU input 51 through the IS register 18 and selector 46. The SA-L1 register 20 selectively receives data from the ALU 28 through a data path 91 and may transfer data to the left ALU input 61 through the selector 58. Similarly, the SB-L1 register 24 selectively receives data from the ALU 28 through a data path 93 and transmits data to the right ALU input 51 through the selector 74.

Referring now to the left side of FIG. 1, there is shown an IL register 95 and an IAR register 97, each of which receives data from the output 87 of the ALU 28 through data paths 99 and 94, respectively. The IL register 95 is a 3-bit register which contains the byte length of the high level instruction being executed in the microprocessor. The IAR register 97 normally contains data for calculating the address of the next high level instruction to be executed in the microprocessor 14. The outputs of the IL register 95 and the IAR register 97 are selectively added in the summer 101, and the result is placed back in the IAR register 97. Also, the output of the IL register 95 may be applied to the left ALU input 61 through a data path 98, and the output of the IAR register 97 is applied through a data path 100 to an AND circuit 102. The AND circuit 102 actually represents sixteen separate AND gates for selectively applying the output of the IAR register 97 to the left ALU input 61 through a data path 104.

Considering next a G register 106, this register is a collection of special control latches used to control various operations of the microprocessor 14. The zero bit of G register 106 determines when instructions are retryable should an error occur in the microprocessor 14. Bits 4 and 6 of G register 106 are used as inputs to registers hereinafter described. The input of G register 106 is connected to the ALU output 87 by a data path 108, and the output of the G register 106 is applied through a data path 110 to an AND circuit 112. The AND circuit 112 represents eight independent AND gates for selectively gating the data in the G register 106 through a data path 114 to the left ALU input 61.

An L register 116 is connected to the output 87 of the ALU 28 by a data path 118 and is normally used to store the length of operands to be used during the execution of a particular high level instruction. The L register 116 may be used as an 8-bit register or as two independent 4-bit registers. When used as two registers, the L register 116 may store two operand lengths. Bit 6 of the G register 106 is used to determine whether the L register 116 will be used as an 8-bit or two 4-bit registers. If bit 6 of G register 106 specifies that the L register 116 is used as two 4-bit registers, an L2S latch 120 determines which of the two 4-bit fields in the L register will be gated when the L register is selected as a source by a microinstruction. The output of the L register 116 is connected through a data path 122 to a selector 124. Selector 124 gates predetermined fields of the L register 116 through a data path 126 to the left ALU input 61.

A P register 128 is an 8-bit register connected to the ALU output 87 by a data path 130, and is primarily used to perform indirect addressing of a local store array hereinafter described. The output of the P register 128 is applied through a data path 132 to a selector 134 that selects certain data fields from the P register and applies the data fields to the left ALU input 61 through a data path 136.

A local store array 138 consists of 128 bytes and is connected to the ALU output 87 through a data path 140. Each byte of the local store array (LSR) 138 is individually addressable for reading and writing, and the addresses to the LSR 138 are generated directly in a manner hereinafter described or indirectly using the P register 128. The high order bit of the address to the LSR 138 is determined under certain conditions by bit 4 of the G register 106. The output of the LSR 138 is applied through a data path 142 to an AND circuit 144 that selectively applies data from the LSR 138 to the left ALU input 61 through a data path 146. Again, the AND circuit 144 represents a multiplicity of independent AND gates for gating data to the ALU 28.

The ALU 28 performs arithmetic or logical operations on data provided from the main store 12. The above described registers that have outputs connected to either of the ALU input 51 or input 61 may be selected as a data source for the ALU 28. Likewise, any register having an input connected to the ALU output 87 may be a destination of data from the ALU. Data from two registers are selected for processing through the ALU by the microinstructions of the microprocessor 14. The ALU performs logical and binary arithmetic operations on bytes. The function of the ALU 28 may be specified directly in a microinstruction or indirectly by an F register 148 whose input is connected to the output of the ALU 28 by a data path 150. The F register 148 may control the operation of the ALU 28 through a signal applied to the ALU 28 through a control line 152.

In addition to performing arithmetic and logical operations, the ALU 28 may be used as a data path. To perform this function, data received on either ALU input 51 or 61 is passed through the ALU 28 to the ALU output 87. The ALU 28 is used as a data path to reduce cost by reducing the number of data paths necessary to achieve a selected capability or function.

An 8-bit S register 154 is connected to the output 87 of the ALU 28 through a data path 156, and the output of the S register is connected through a data path 158 to the left ALU input 61. The S register 154 contains ALU and shift condition codes and temporary microprogram flags. Shift condition codes are applied to the S register 154 from the ALU 28 on control line 160. Bits 0–3 of the S register 154 are normally used for flags and bits 4–7 are normally used to contain the ALU and shift condition codes. The microprogram can branch on each of the eight bits of the S Register 154.

Next address logic 162 is connected through a data path 161 to the output 87 of the ALU 28. In response to data received from various parts of the microprocessor 14, the next address logic 162 builds a next address code which will subsequently be used to select the microinstruction in the control store 30 to be executed following the execution of a presently executing microinstruction. The output data of the next address logic 162 is applied to a 14-bit control store address register (CSAR) 164 through control lines 165. The address loaded into the address register 164 selects a microinstruction stored in the control store 30 which is loaded into a control store output register (CSOR) 166. The output register 166 is also a 32-bit register, and each control word in the control store 30 is 32 bits in length. Separate or independent parts of the control store 30 operate at different speeds, thereby limiting the operating speed of the microprocessor 14 according to which part of the control store 30 is being used at a particular time. Also, as previously described, microinstructions may be transferred into the control store 30 from the main store 12 through the registers 22 and 26.

Certain fields of the control store output register 166 are applied to the next address logic 162 through control line 168 and to a microinstruction decode and control unit 170 through a data path 172. The control unit 170 applies FORMAT signals to the next address logic 162 through the control line 174. The FORMAT signals transfer data to the next address logic 162 indicating the type or format of the microinstruction presently being executed. The next address code loaded into the address register 164 is selectively built in the next address logic 162 from data received on control lines 168 and 174 and is placed on the control line 165.

The control unit 170 applies a CONTROL B signal on control line 176 to increment the value in the B register 82, causing the selector 74 to select the next byte in the SB-L1 register 24. When the selector 74 receives a control signal to gate data, the selected byte in register 24 will be gated to the ALU 28. A RIGHT ALU SOURCE signal is produced on control lines 178 to gate data from a selected register to the right input 51 of the ALU 28. The RIGHT ALU SOURCE signal will activate either the AND circuit 90, the selector 74 or the selector 46 to gate either the data from the M register 84, the SB-L1 register 24 or the IS register 18, respectively, to the right input 51 of the ALU 28. It will be understood that only one register will be gated to the right ALU input 51 at any one time.

The control unit 170 generates a CONTROL I signal on control line 180 for incrementing the value in the I register 52. This incrementation causes the selector 46 to point or select to the next byte in the IS register 18 in the same manner as described in regard to B register 82. A DIRECT ALU FUNCTION signal is produced on control lines 182 to determine the arithmetical logic function of the ALU 28. One function that may be chosen by the DIRECT ALU FUNCTION signal is that the ALU 28 perform the function specified in the F register 148. Thus, the DIRECT ALU FUNCTION signal may directly specify the function of the ALU 28 or indirectly specify the function through the F register 148. CONTROL WORD EMIT signals are produced on the data path 184 by the control unit 170 and are applied to the left ALU input 61. The ALU 28 passes the CONTROL WORD EMIT signals to the output 87 and loads the F register 148 through the data path 150. In this manner, the F register 148 is placed in condition by the control unit 170 for controlling the function of the ALU 28.

A CONTROL A signal is produced on a control line 186 by the control line 170 for incrementing the value in the A register 64. In response to being incremented, the A register 64 causes the selector 58 to point to or select the next byte in the SA-L1 register 20. The selected byte will be gated to the left input 61 of the ALU 28 when the selector 58 is activated. On control lines 188, the control unit 170 produces an S REGISTER EMIT signal which loads bits 0–3 in the S register 154. DIRECT LSR ADDRESS signals are produced on control lines 190 to directly address the local store ARRAY 138. A CONTROL L2S LATCH signal produced on control line 192 is applied to the L2S latch 120 to control the state of the L2S latch.

CONTROL G REGISTER BIT signals are produced on control lines 194 by the control unit 170 to determine the state of bits 0, 4 and 6 of the G register 106. An INCREMENT IAR signal is produced on control line 196 which is applied to the summer 101 causing the data in the IL register 95 to be added to the data in the IAR register 97 and placing the result in the IAR register 97.

The control unit 170 produces LEFT ALU SOURCE signals on control lines 198 to gate the data of one register to the left ALU input 61. As with the right ALU input 51, only one register may be gated to the left ALU input 61 at one time. The LEFT ALU SOURCE signals are applied to either the AND circuits 102, 112 or 144 or the selectors 124, 134 or 58. In this configuration, the control unit 170 will gate data to the left input 61 of the ALU 28 from one of the following: the IA register 97, the G register 106, the L register 116, the P register 128, the local store array 138 or the SA-L1 register 20.

STORAGE COMMANDS are applied from the control unit 170 through control lines 200 to the virtual address translator 10. Such STORAGE COMMANDS control the fetching of high level instructions, operands and other data from the main store 12 for use in the microprocessor 14.

It will be appreciated that the operation of the microprocessor 14 is primarily controlled by the microinstructions from control store 30 which are decoded in the microinstruction decode and control unit 170. This control unit 170 is a logic unit constituting an important part of the present invention and providing for inexpensive, efficient and flexible operation of the microprocessor 14. That portion of the microinstruction decode and control unit 170 that is pertinent to the present invention will hereinafter be described in greater detail in conjunction with the figures following FIG. 1.

A timing unit 202 provides C1 and C2 CLOCK signals on control line 204 with C2 being displaced in time with respect to the C1 clock. The timing unit 202 also produces a FIRST HALF-CYCLE signal on control line 206 which is received by the control unit 170. In the execution of certain microinstructions it may be desirable to use the same data path or control lines twice during the execution of a single microinstruction. The selected data path will be used for one purpose during the first half of the microinstruction execution cycle, and for a second purpose during the last half of the microinstruction execution cycle. The FIRST HALF-CYCLE signal indicates the end of the first half-cycle to the control unit 170 to facilitate the use of one data path or control line for two separate purposes or functions during one execution cycle.

A SHORT CYCLE signal is applied from the control unit 170 to the timing unit 202 through control line 208 to indicate that the particular microinstruction being executed has a short execution cycle relative to the execution cycle of microinstructions designated as normal. In response to the SHORT CYCLE signal, the timing unit 202 produces fewer timing clocks or rings per execution cycle. The control unit 170 also applies a SLOW CYCLE signal to the timing unit 202 on control line 210. This SLOW CYCLE signal causes the timing unit to produce more timing clocks or rings per execution cycle. It is necessary to produce this SLOWER CYCLE signal when slower microinstructions of the control store 30 are used. Two additional control signals generated by the timing unit 202 are a LOAD CSOR signal for sequencing the output register 166, and a CARD SELECT signal connected to the control store 30.

In response to signals received from the control unit 170, the timing unit 202, the virtual address translator 10, and the main store 12, a main store interface control 212 controls the interface between the microprocessor 14 and the main store 12. LOAD signals are selectively produced on control lines 214 to cause the loading of data into the following: SA-L1 register 20, SA-L2 register 22, IB register 16, IS register 18, SB-L1 register 24 and SB-L2 register 26. It will be appreciated that only one of the registers 20, 16 or 24 should be loaded with data from the main store 12 at one time unless it is desired to load the same data into two or more registers. These registers 16, 20 and 24 share the same main data path 32 from the main store 12 to the microprocessor 14. Likewise, only one of the registers 16, 20 and 24 should be loaded from the ALU output 87 at one time.

The main store interface control 212 receives STORAGE COMMANDS from the control unit 170 on control lines 200 and receives DATA READY signals from the main store 12 on the control lines 216. CONTROL signals are received by the main store interface control 212 on control line 218 from the virtual address translator 10, and CLOCK signals, C1 or C2, are received on control line 204. The DATA READY signal indicates to the main store interface control 212 that data is ready at the output of the main store 12 for being received by the microprocessor 14. The CONTROL SIGNAL on control line 218 indicates that a translation has been completed in the virtual address translator 10 and a main store access is being initiated. Also, the CONTROL signals on control lines 218 can indicate that a complete translation in the virtual address translator 10 cannot be accomplished.

The main store interface control 212 also receives a MAIN STORE ERROR signal on signal line 220 from the OR gate 44. A MAIN STORE ERROR signal is produced when erroneous or invalid data is detected by parity check circuit 56, 40 or 72. In response to the MAIN STORE ERROR signal, the main store interface control 212 will prevent the microprocessor 14 from operating using the erroneous data. Finally, the main store interface control 212 produces a HOLDOFF signal on control line 222 which is connected to the timing unit 202. The HOLDOFF signal will cause the timing unit 202 to inhibit the operation of the control store 30 by interrupting the generation of LOAD CSOR signal to the output register 166. The purpose of the HOLDOFF signal is to temporarily suspend the execution of the microinstruction under certain conditions.

An important aspect of the present invention relates to the logic contained in the microinstruction decode and control unit 170 and the next address logic 162. The first microinstruction loaded into the CSOR from the control store 30 to begin the execution of a high level instruction is called an end op (end operation) word. In response to the end op word, the control unit 170 initializes and personalizes selected registers in the microprocessor 14 to place these registers in a condition to facilitate the subsequent execution of any of the following microinstructions. The control unit 170 is also responsive to the end op word to gate the op code of the high level instruction contained in the IS register 18 through the ALU 28 to the next address logic 162. The next address logic 162 is responsive to the op code to load data into the address register 164 to select the next word to be produced by the control store 30.

The control store 30 contains a plurality of I-1 words and a plurality of I-2 words. Each one of the I-1 or I-2 words corresponds to or is identified with a particular high level instruction operation code. The next address logic 162 causes a branch to select the I-1 or I-2 word that corresponds to the op code of the high level instruction being executed in the microprocessor 14. The selected I-1 or I-2 word is produced by the control store 30 and loaded into the output register 166.

The I-1 word includes a data field specifying the address in the control store 30 of the next microinstruction to be executed. If an I-1 word is produced by the control store 30, the control unit 170 causes the next address logic 162 to build this address specified in the I-1 word and load the next address into the address register 164. Also, in response to an I-1 word, the control unit 170 will personalize the microprocessor 14 by loading the F register 148 with data identifying a logical or arithmetic operation to be performed by the ALU 28 and will also personalize G register 106 and S register 154 to facilitate the execution of the particular high level instruction presently executing in the microprocessor 14. After the execution of an I-1 word, the next microinstruction selected by the I-1 word and produced by the control store 30 begins the E-phase of microprocessor execution.

An I-2 word includes the address of an operand fetch routine and a first E-phase address. In response to an I-2 word, the control unit 170 will cause the next address logic 162 to build the address in accordance with the operand fetch routine address contained in the I-2 word and load this address into the address register 164. Also, in response to the I-2 word, the microinstruction decode and control unit will load the first E-phase address into the local store array 138 and will load data into at least one other register to place the microprocessor in a personalized condition to facilitate the subsequent continued execution of the particular high level instruction presently executing in the microprocessor.

After the execution of the I-2 word, the control store 30 will produce the operand fetch routine microinstruction specified by the I-2 word. The microprocessor 14 will perform the operand fetch routine to fetch one or more operands from the main store 12 for use in the microprocessor 14. After the operands have been fetched and stored in the microprocessor 14, the control store 30 produces a return word. The decode and control unit 170 is responsive to the return word to cause the first E-phase address stored in the local store array 138 to be gated through the next address logic 162 and loaded into the address register 164. After the execution of the return word, the control store 30 issues a microinstruction to begin the E-phase of the high level instruction execution.

Figure 2:
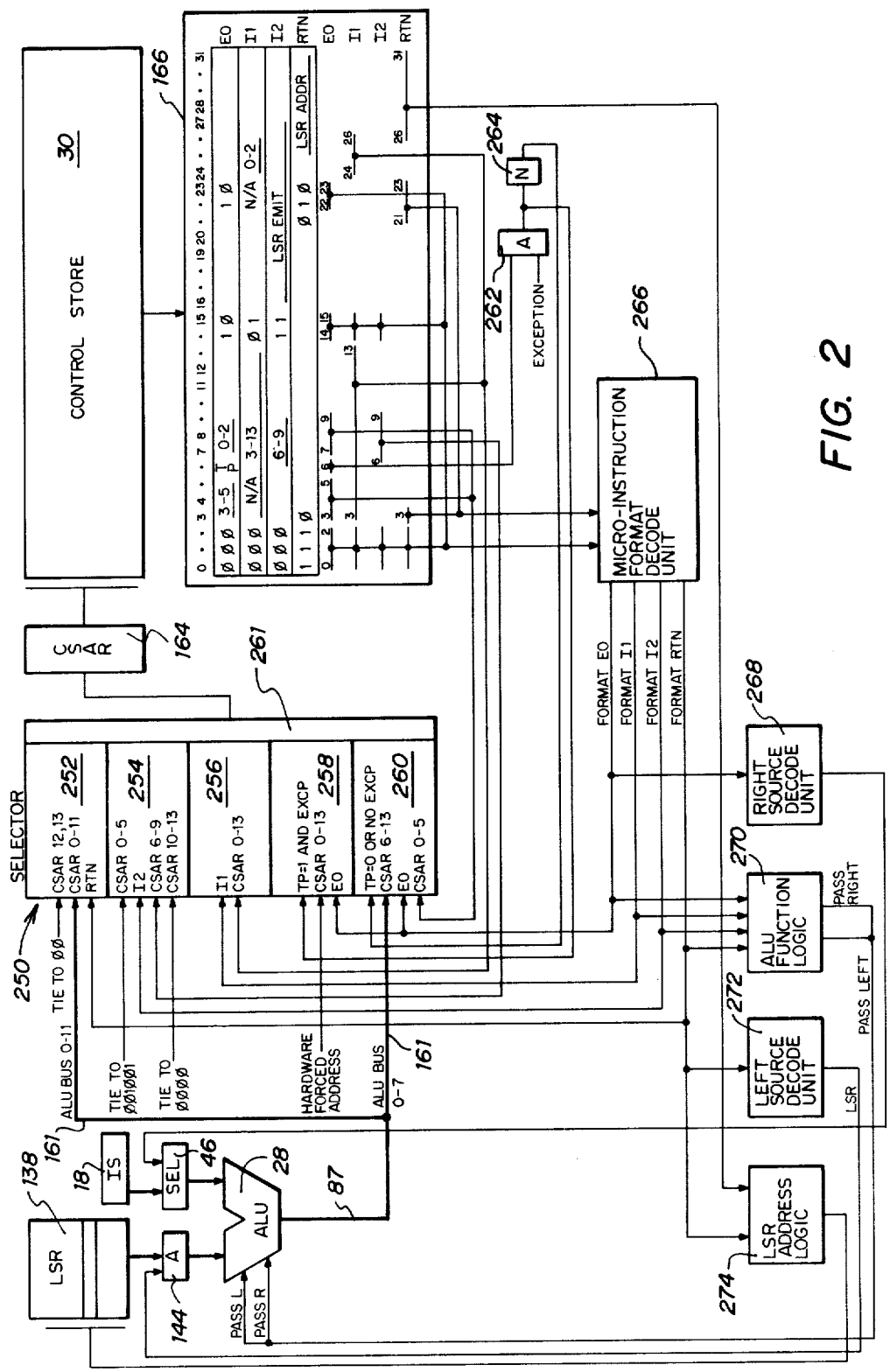
FIG. 2 is a diagram of logic circuitry for use in a computer to address a local store array and a control store.

Referring now to FIG. 2, there is shown a diagram of the logic circuitry of microprocessor 14 used to address the local store array 138 and the control store 30. A selector 250 is shown connected to the control store address register 164 and represents logic circuitry contained in the next address logic 162 (FIG. 1) that is used to build the next microinstruction address during the end op, I-1, I-2 and return words. The selector 250 is divided into AND circuits 252, 254, 256, 258 and 260 that provide inputs to an OR circuit 261. Each of these AND circuits contains fourteen AND gates. The OR circuit 261 includes fourteen five input OR gates with each of the OR gates receiving one input from each of the AND circuits 252, 254, 256, 258 and 260. These AND circuits are operable when activated to supply an address through the OR circuit 261 for being loaded into the address register 164. In order to achieve meaningful results, only one of the AND circuits 252, 254, 256, 258 or 260 should be activated at one time.

In FIG. 2, the control store output register 166 is shown with a table within the register 166 detailing the content of this register when loaded with a particular word and also detailing control line connections from selected bits of the output register 166. The table in the top half of the register 166 specifies the information that is loaded into the output register 166 when an end op, I-1, I-2 or return word is produced by the control store 30. The vertical lines shown in the lower half of register 166 represent one or more control lines connected between the register 166 and other components of the computer. The horizontal lines in the lower half of register 166 identify the specific bits in output register 166 to which control lines are connected.

An AND gate 262 is shown below the output register 166 and includes one input connected to bit 6 of the output register 166 and a second input connected to an EXCEPTION signal. The EXCEPTION signal indicates that an external event has occurred which requires the services of the microprocessor. If the EXCEPTION signal is present and bit 6 has a value of one, the AND gate 262 produces a signal at its output. An inverter 264 is connected to the output of the AND gate 262 and produces a signal opposite from the output signal of the AND gate 262.

A microinstruction format decode unit 266 is shown in FIG. 2 connected to bits 0–3, 14, 15, 21, 22 and 23 of the control store output register 166. These bits are used by the format decode unit 266 to identify the format of a control word. The outputs of the format decode unit 266 correspond to the outputs shown on control line 174 in FIG. 1. The format decode unit 266 and a right source decode unit 268, an ALU function logic 270, a left source decode unit 272 and LSR address logic 274 are each contained in the microinstruction decode and control unit 170 shown in FIG. 1.

When an end op word is loaded into the control store output register 166, the format decode unit identifies and distinguishes the end op word and produces a FORMAT END OP signal which is applied to the right source decode unit 268, the ALU function logic 270, and the AND circuits 258 and 260. In response to the FORMAT END OP signal, the right source decode unit 268 applies an IS signal to the selector 46 to gate the first half word in the IS register 18 to the ALU 28, and the ALU function logic 270 applies a PASS RIGHT signal to the ALU 28 causing the first half word of the IS register 18 to be produced at the ALU output 87. The first eight bits of this half word are designated as the op code (operation code) and specify a particular arithmetic or logical function to be performed by the ALU 28.

Also in response to the FORMAT END OP signal, either the AND circuit 260 or 258 is activated. If the TP field, bit 6 of the end op word is zero or if no EXCEPTION signal is present, the AND gate 262 will produce a "zero" output and the invertor 264 will produce a "one" output which is applied to AND circuit 260. The simultaneous presence of the FORMAT END OP signal and the "one" output of the invertor 264 activates the AND circuit 260 to produce an address for loading into address register 164. AND circuit 260 gates the data of bits 3-5 and 7-9 of the output register 166 into bits 0-5 of the address register 164 and gates the op code, bits 0-7 of the IS register 18, to be loaded into bits 6-13 of the control store address register 164. In this manner, the address loaded into register 164 corresponds to the op code of the high level instruction being executed. Thus, the operation code is used to select one of a plurality of I-1 words or one of a plurality of I-2 words that are stored in the control store 30.

When an end op word is loaded into the output register 166 and bit 6 of the register is one and an EXCEPTION signal is applied to the AND gate 262, the output of the AND gate goes to one and activates AND circuit 258 of the selector 250. In such case, a preselected hardware forced address is loaded into the control store address register 164 to select a microinstruction in control store 30 that will permit the microprocessor to perform a function required by an external event. By specifying bit 6 of the end op word as either zero or one, a choice is made as to whether a program can be interrupted to perform an external function. Since the end op word always occurs just after the complete execution of a high level instruction, the presence of an end op word indicates a convenient time to interrupt the execution of a program.

When an I-1 word is loaded into register 166, the format decode unit 266 recognizes the I-1 word and produces a FORMAT I-1 signal that is applied to the ALU function logic 270 and to AND circuit 256 of the selector 250. In response to the FORMAT I-1 signal, the AND circuit 256 is activated and supplies data from bits 24-26 and 3-13 of output register 166 for loading into bits 0-13 of the control store address register 164. In this manner, the I-1 word is operable to directly select the next microinstruction to be produced by the control store 30 to begin the E-phase of the high level instruction execution.

When an I-2 word is loaded into the control store output register 166, the format decode unit 266 produces a FORMAT I-2 signal which is applied to the ALU function logic 270 and to the AND circuit 254 of selector 250. In response to the FORMAT I-2 signal, the AND circuit 254 forces bits 0-5 of the address register 164 to 001001 and forces bits 10-13 of the address register 164 to 0000. Bits 6-9 of the address register 164 are supplied data from bits 6-9 of the output register 166 through the AND circuit 254. In this manner, the I-2 word is operable to select one of sixteen operand fetch routines held in the control store 30. After the execution of the I-2 word, the selected operand fetch routine is executed.

A significant aspect of the present invention relates to the above described branch implemented by AND circuit 254 to select an operand fetch routine. The 4-bit field from the I-2 word was loaded into middle bits 6-9 of the address register 164. The consecutive binary numbers 0000 through 1111 will specify noncontiguous, spaced apart memory locations in the control store 30. The operand fetch routines are stored at such noncontiguous memory locations so that the branch implemented by AND circuit 254 will immediately start the fetch routine. If bits 6-9 of the I-2 word were loaded into bits 0-3 of the address register 164 to select contiguous memory locations in the control store 30, there would not be sufficient room at such contiguous memory locations to store the entire operand fetch routine. It would be necessary to perform another branch to go to the memory location containing the operand fetch routine.

When the selected fetch routine is completed, the control store 30 produces a return word which is loaded into the output register 166. In response to the return word, the format decode unit 266 produces a FORMAT RETURN signal that is applied to the ALU function logic 270, the left source decode unit 272, the LSR address logic 274 and the AND circuit 252 of selector 250. Also, data from bits 26-31 of the output register 166 is applied to the LSR address logic 274. In response to the FORMAT RETURN signal, bits 26-31 of output register 166 are applied by the LSR address logic 274 to the LSR 138 to select a first E-phase address. The E-phase address is gated by the AND circuit 144 from the LSR (local store array) 138 to the ALU 28 in response to an LSR signal from the left source decode unit 272.

The ALU function logic 270 produces a PASS LEFT signal in response to the FORMAT RETURN signal which is applied to cause the ALU 28 to pass the first E-phase address to the ALU output 87.

The FORMAT RETURN signal then activates the AND circuit 252 which forces bits 12 and 13 of the address register 164 to 00 and applies the first E-phase address that was stored in the LSR 138 to bits 0-11 of the address register. The first E-phase address was originally stored in the LSR 138 during the execution of the I-2 word and corresponds to the op code of the high level instruction being executed.

Figure 3:
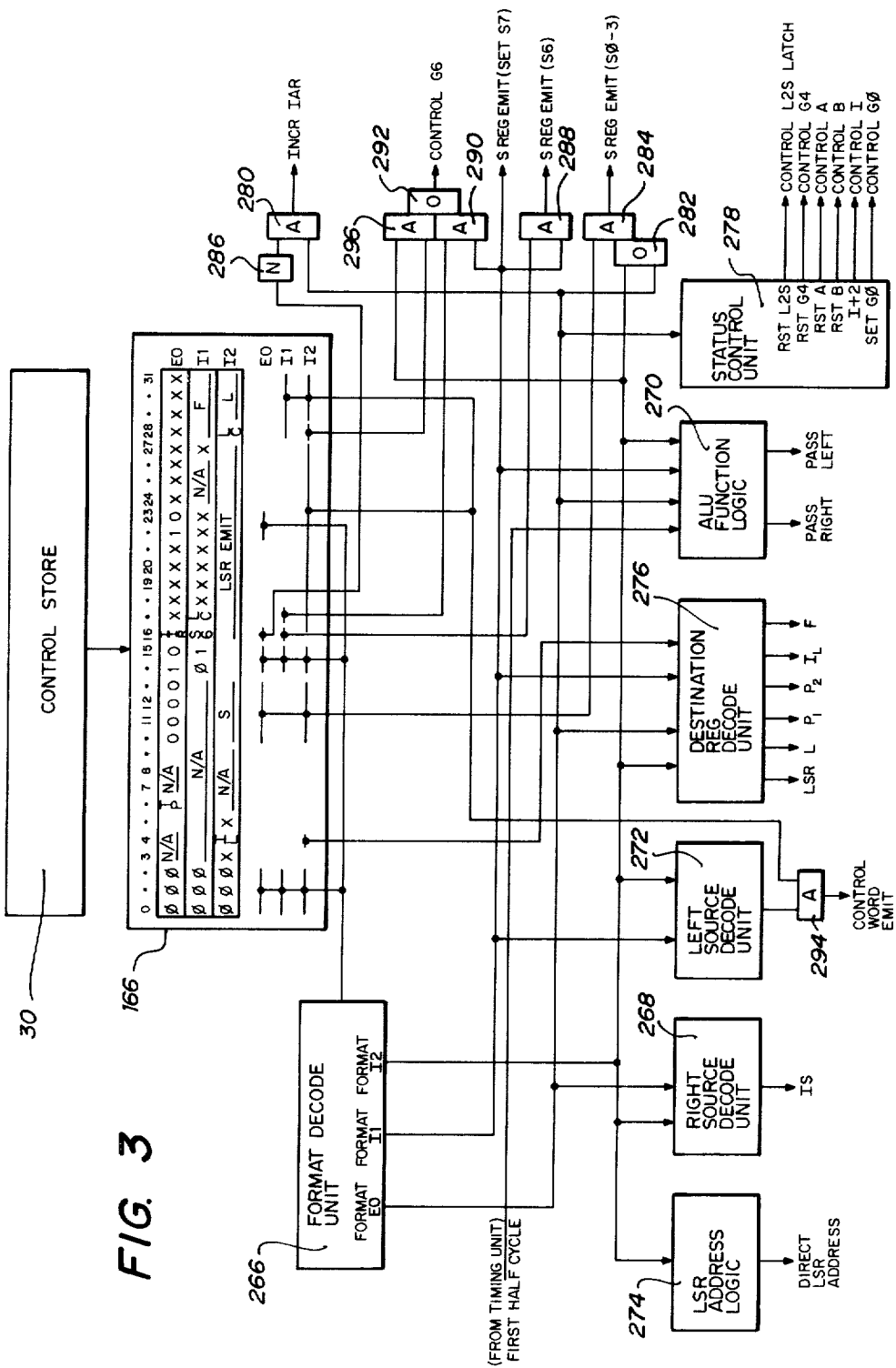
FIG. 3 is a diagram illustrating the logic of the present invention used to control the operation and flow of data through a microprocessor.

Referring now to FIG. 3 in conjunction with FIG. 1, there is shown a logic diagram illustrating the logic used to control the operation of and flow of data through the microprocessor 14. As in FIG. 2, a table is included within output register 166 previously shown in FIG. 1 to illustrate the content of the register 166 and to show selected control line connections. The table in the top half of register 166 shows three different words that may be loaded into the register, the end op, I-1 and I-2 words. Within the lower half of the register 166, the vertical lines indicate one or more control lines connected to the register 166, and the horizontal lines indicate the bits to which the control lines are connected. A vertical line connected to a horizontal line in the lower half of the register 166 indicates that control lines are connected to all of the bits directly above the particular horizontal line.

The format decode unit 266 is connectd to the output register 166 in exactly the same manner as shown in FIG. 2, except that control lines relevant only to the return word have been eliminated in FIG. 3. When an end op word is placed in the register 166, the format decode unit 266 produces a FORMAT END OP signal that is applied to the right source decode unit 268 and the ALU function logic 270 which produce GATE IS signals and PASS RIGHT signals, respectively. The FORMAT END OP signal is also applied to a destination register decode unit 276, a status control unit 278, an AND gate 280 and an OR circuit 282. The output of the OR circuit 282 is applied to an AND circuit 284 whose output is the S REGISTER EMIT signal which is loaded into bits 0-3 of the S register 154 (FIG. 1). When the OR circuit 282 is activated by the FORMAT END OP signal, bits 10-13 of the end op word which are all zeros are gated through the AND circuit 284 and loaded into the S register 154.

When the AND gate 280 is activated by the FORMAT END OP signal, the output of inverter 286 is produced as the INCREMENT IAR signal. The inverter 286 has an input connected to bit 16 of the output register 166, the IIR field of the end op word. If the IIR field is equal to zero, then the output of the inverter 286, the INCREMENT IAR signal, is applied to the summer 101, causing the value of the IL register 95 to be added to the value of the IAR register 97 with the result placed in the IAR register. The IAR register originally contained the main store address of the presently executing high level instruction and the IL register contained the length of this instruction so that the sum of these registers produces the address of the next high level instruction. If the IIR field is one, the INCREMENT IAR signal is equal to zero, and the contents of the IAR register 97 remain unchanged.

In response to the FORMAT END OP signal, the destination register decode unit 276 produces IL, P1, P2 and L signals which are applied, respectively, to control the IL register 95, the first four bits of the P register 128, the second four bits of the P register 128 and the L register 116. (FIG. 1). The IL signal from the destination register decode unit 276 causes the length of the high level instruction currently executing in the microprocessor to be loaded into the IL register 95.

When executing high level instructions, it is necessary to keep a pointer to the next instruction to be executed and to keep the length of the high level instruction currently executing so that any problem encountered can be traced back to the instruction executing at the time of the problem. The IAR register 97 and the IL register 95 serve this purpose. The end op control word automatically updates the IL register 95 and the IAR register 97 eliminating the need for more control words and execution time during E-phase for performing this function.

Regardless of the format and type of instruction to be executed, each byte of the instruction must eventually be used. Bits 8-15 of the high level instruction are typically a length count of data fields to be operated on or base pointer register specifications to be used in the E-phase of execution. The L, P1 and P2 signals from the destination register decode unit 276 cause bits 8-15 of the high level instruction in the IS register 18 to be gated and loaded into the L register 116 and the P register 128. Since the end op word performs this function, time and words in E-phase of execution are saved.

Every microcode routine must know the value or state of the various hardware facilities before using them. If the state is not known, then the microprogram must execute control words to initialize the facilities to a known state. The end op control word performs this initialization function for certain hardware facilities that are commonly used by the microcode through the status control unit 278. The initialization performed during the end op word also saves microprogram time and control words.

In response to the FORMAT END OP signal, the status control unit 278 initializes hardware by producing the following signals: CONTROL L2S LATCH, CONTROL G4, CONTROL A, CONTROL B, CONTROL I and CONTROL G0. The CONTROL L2S latch signal from the status control unit 278 initializes the L2S latch 120 (FIG. 1) to zero. The L register 116 (FIG. 1) can be uncoupled and used as two 4-bit counter registers. The L2S latch 120 determines which four bits are to be gated when the L register 116 is specified as a source or destination for an operation. Initializing the L2S latch 120 to zero selects bits 0-3 of the L register 116 to be gated to or from the ALU 28.

The CONTROL G4 signal initializes bit 4 of the G register 106 (FIG. 1). This bit is used as the high order address bit for addressing of the LSR 138. Thus, a microprogram must know the state of this bit before performing a local store operation.

The CONTROL A and CONTROL B signals from the status control unit 278 are applied, respectively, to registers 64 and 82 (FIG. 1) to initialize these registers to a 00 state. Thus, the end op word resets A register 64 and B register 82 to point to the first half word in the registers 20 and 24 which are normally used to hold operands.

The CONTROL I signal from status control unit 278 is applied to the I register 52 (FIG. 1) to increment this register by two. As previously described, the end op word causes a half word in the IS register 18 to be gated through the ALU 28 and loaded into the appropriate registers. After this operation, the end op word increments the I register 52 by 2 to point to the second half word of the high level instruction in the IS register 18.

The CONTROL G0 signal is applied to the G register 106 to initialize bit 0 to a value of one. This bit indicates whether or not a high level instruction is retriable if a hardware error occurs. All instructions begin their operation by being retriable, and the end op word indicates this fact by initializing bit 0 to one.

When an I-1 word is loaded into the control store output register 166, logic in the microprocessor initializes various hardware facilities and then causes a branch to the first microinstruction of the E-phase of execution. In response to an I-1 word, the format decode unit 266 generates a FORMAT I-1 signal that is applied to the left source decode unit 272, the destination register decode unit 276, the ALU function logic 270 and to AND gates 288 and 290. The FORMAT I-1 signal is also applied to initialize bit 7 of the S register 154 (FIG. 1) to a value of one. Bit 7 of the S register 154 is the zero indicator for an operation of the ALU 28. This indicator must be initialized to one before the ALU operation, and by initializing this indicator with the FORMAT I-1 signal, it is not necessary to use subsequent execution time and control words to perform this function.

One input of the AND gate 288 is connected to bit 16 of output register 166 which is the S6 field of the I-1 word. In response to the FORMAT I-1 signal, the AND gate 288 will produce an output corresponding to bit 16 of the output register 166. The output of the AND gate 288 is loaded into bit 6 of the S register 154. Bit 6 of the S register 154 is the carry in value used in various operations of the ALU 28. For an add operation, bit 6 of the S register 154 must be "zero" and for a subtract operation this bit 6 must be "one" before the operation of the ALU 28 is performed. The I-1 word personalizes the S register 154 in preparation for subsequent E-phase operations, and microcode does not have to be used during the E-phase to place the S register in proper condition.

One input of the AND gate 290 is connected to bit 17 of the output register 166, the LC field of the I-1 word. The output of the AND gate 290 is connected to an OR gate 292. When the FORMAT I-1 signal is applied to the AND gate 290, the output of the OR gate 292 will correspond to the LC field of the I-1 word and is applied to control bit 6 of the G register 106 (FIG. 1). This bit controls whether the L register 116 will function as one or two registers. If the LC field of the I-1 word is zero, the L register 116 will function as two 4-bit registers, if this bit is one, the L register will function as a single 8-bit register.

The I-1 word includes an F field, bits 28-31 of the output register 166, which specifies the function to be performed by the ALU 28. Bits 28-31 of the register 166 are connected to an AND circuit 294 that represent four separate AND gates. In response to the I-1 word, the left source decode unit 272 produces a LEFT SOURCE signal which is applied to an input of the AND circuit 294. The AND circuit 294 then produces CONTROL WORD EMIT signals corresponding to the F field in the I-1 word. The CONTROL WORD EMIT signals, shown on data path 184 in FIG. 1, are applied to the left ALU input 61. Also, in response to the FORMAT I-1 signal, the ALU function logic 270 produces a PASS LEFT signal that is applied to the ALU 28. The PASS LEFT signal causes the CONTROL WORD EMIT signals to be passed to the ALU output 87 and then loaded into the F register 148 in response to an F signal from the register decode unit 276.

Many high level instructions are similar or identical in their execution except for the function performed by the ALU 28. The I-1 word preloads the F register 148 and S-Ray (zero and carry-in) ALU controls to specify the appropriate function of the ALU 28, and the microprocessor 14 can then branch to a common microcode routine to perform the operation of the high level instruction. In this manner, a substantial savings of control words is realized.

When an I-2 word is loaded into the output register 166, the format decode unit 266 produces a FORMAT I-2 signal that is applied to the LSR address logic 274, right source decode unit 268, the left source decode unit 272, the destination register decode unit 276, ALU function logic 270, the OR circuit 282 and to an AND gate 296. The other input of the AND gate 296 is connected to bit 28 of the output register 166, and LC field of the I-2 word. The output of the AND gate 296 is connected to an input of the OR gate 292. When the I-2 word is produced, the output of the OR gate 292 corresponds to the LC field in the I-2 word and is applied to bit 6 of G register 106. Depending on the particular high level instruction, the second byte of the high level instruction may specify one 8-bit length value for an operand in main store 12, or it may specify two 4-bit length values for two operands. In the case of a high level instruction specifying two length values, the L register 116 is uncoupled by the CONTROL G6 signal so that the two lengths may be stored in the two 4-bit fields in the L register 116.

The output of the OR circuit 282 is connected to one input of the AND circuit 284. The other input of the AND circuit 284 is connected to bits 10-13 of the output register 166, the S field of the I-2 word. In response to the I-2 word, the output of the AND circuit 284 corresponds to the S field of the I-2 word and is applied to personalize bits 0-3 of the S register 154. These bits are mainly used as microprogramming flags for use in subsequent operand fetch routines that are performed after the execution of the I-2 word. By personalizing bits 0-3 of the S register with the I-2 word, it is not necessary to perform this function in a following operand fetch routine.

When the FORMAT I-2 signal is produced, the left source decode unit 272 responds to produce a LEFT SOURCE signal that is applied to the AND circuit 294. The AND circuit 294 is actually a multiplicity of AND gates. The other inputs to AND circuit 294 are connected to bits 16-27, 29-31 of the G register 106, and in response to the LEFT SOURCE signal from the left source decode unit 272, the output of the AND circuit 294 corresponds to the aforementioned bits of the output register 166. The CONTROL WORD EMIT signals are shown in FIG. 1 on data path 184. The LSR emit field of the I-2 word, bits 16-27 of output register 166, are applied to the left ALU input 61, and the L field of the I-2 word, bits 29-31 of register 166, are applied to the IL register 95.

A FIRST HALF-CYCLE signal is applied to ALU function logic 270. In response to the FORMAT I-2 signal and FIRST HALF-CYCLE signal, the ALU function logic 270 produces a PASS RIGHT signal during the first half-cycle of the execution of the I-2 word, and a PASS LEFT signal during the last half cycle. When the PASS RIGHT signal is being applied to the ALU 28, the destination register decode unit 276 produces an LSR signal which is applied to the LSR 138 to cause the LSR emit field of the I-2 word to be written into the LSR 138. The destination register decode unit 276 also produces a LOAD L signal which is applied to the L register 116 causing the L field of I-2 to be loaded into the L register. The L field of the I-2 word had been previously passed from the left ALU input 61 to the ALU output 87.

The LSR emit field of the I-2 word specifies the address of the first microinstruction to be executed during E-phase. After an operand fetch routine has been performed, the LSR emit field will be retrieved from the local store array 138 and loaded into the control store address register 164 in the manner previously described. Saving the E-phase address, the LSR emit field, in the local store array 138 provides linkage between the operand fetch routine and the appropriate mathematical or logical operation to be performed during the E-phase of high level instruction execution.

The value in the IL field of the I-2 word, bit 5 in register 166, determines if the L register 116 is to be loaded. If IL is equal to zero, then the L register 116 is loaded with the L field of the I-2 word, but if IL is equal to zero, the data in the L register does not change. The fifth bit of output register 166 is applied directly to the destination register decode unit 176. If the IL field has a value of one, the register decode unit 276 will not produce the L signal in response to the I-2 word.

In some instructions, the length of the operand data field is implied by the operation code in the high level instruction. In these cases, the FORMAT I-2 signal causes the destination register decode unit 276 to produce the L signal which causes the length value implied by the operation code to be loaded into the L register.

During the first execution half-cycle of the I-2 word, the destination register decode unit 276 is responsive to the format I-2 word and the FIRST HALF-CYCLE signal to produce the $P_2$ signal which is applied to the P register 128. The $P_2$ signal causes bits 4-7 to the P register 128 to be loaded with bits 0-3 of the second half word of the high level instruction in the IS register 18 which are pointed to by the I register 52. The data placed in bits 4-7 of the P register 128 is used later in an operand fetch routine for calculating the storage operand effective address in the main store 12. By loading this information in the P register 128 during the execution of the I-2 word, the operand fetch routine does not have to spend time and control words performing this function later.

Figure 4:
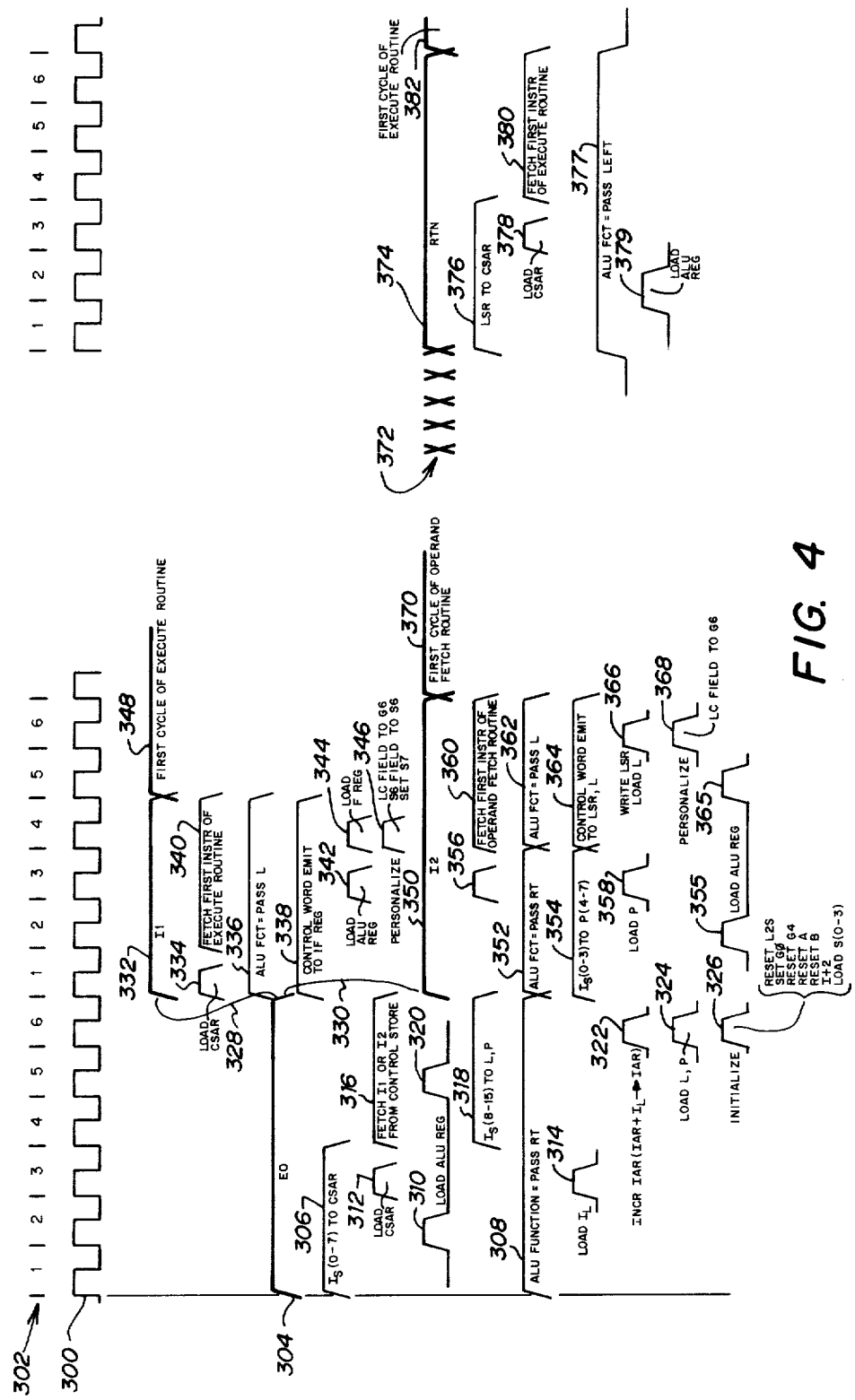
FIG. 4 is a timing diagram graphically summarizing the operation of control logic during the execution cycle of selected I-phase control words.

Referring now to FIG. 4, there is shown a timing diagram which graphically represents the timing and operation of the microprocessor 14 during the execution cycle of the end op word, the I-1 word, the I-2 word and the return word. A train of timing clocks 300 is shown across the top of FIG. 4. A number row 302 is used to number the clocks 300 to reference time positions in the execution cycle of control words to be hereinafter described. The vertical lines between the numbers in number row 302 represent the beginning and end of each clock. It will be understood that the timing chart of FIG. 4 is somewhat simplified to facilitate the timing involved in the present invention. All references to hardware in the following description of FIG. 4 refer to the hardware shown in FIGS. 1-3.

An end op pulse 304 is shown extending from the first timing clock to the second timing clock and represents the execution cycle of the end op word. All of the functions performed during the execution of the end op word are performed during six timing clocks following the complete execution of the prior high level instruction.

An IS pulse 306 is shown below the end op pulse 304 to indicate that the first eight bits of the high level instruction in the IS register 18 are selected and gated to the right ALU input 51 during the first three clocks of the end op word execution cycle. An ALU function pulse 308 extends from the beginning of the first clock to the end of the sixth clock in the end op word execution cycle. During this time period, the ALU function is specified as PASS RIGHT such that the ALU 28 will pass data from the right ALU input 51 to the ALU output 87.

A first load ALU pulse 310 occurs on the second clock of the end op word execution cycle to indicate that the ALU 28 is loaded. At this time, the first eight bits of the high level instruction in the IS register 18 are being gated to the right ALU input 51 and the function of the ALU 28 is specified as PASS RIGHT. Thus, the load ALU pulse 310 indicates that the first eight bits of the high level instruction in the IS register 18 will appear at the ALU output 87 and will be applied to the next address logic 162. Under normal operating conditions, the next address logic 162 will build the next address in accordance with the data from the first eight bits of the high level instruction in the IS register 18 which is the op code.

A load CSAR pulse 312 and a load IL pulse 314 occur on the third clock of the end op word execution cycle. The load CSAR pulse 312 indicates that the address register (CSAR) 164 is loaded by the next address logic 162 with an address corresponding to the op code of the high level instruction presently executing in the microprocessor. The load IL pulse 314 indicates that the IL register 95 is loaded with the length of the high level instruction presently executing in the microprocessor.

A fetch I-1 or I-2 pulse 316 and an IS pulse 318 both begin at the fourth clock and extend through the sixth clock of the end op word execution cycle. The fetch I-1 or I-2 pulse 316 indicates that the control store 30 fetches either an I-1 or an I-2 word during the fourth, fifth and sixth clocks. The address which has previously been loaded into the control store address register 164 determines I-1 or I-2 word is fetched. The IS pulse 318 indicates that bits 8-15 of the high level instruction in the IS register 18 are selected and gated through the selector 46 to the right ALU input 51 during the fourth, fifth and sixth clocks.

A load ALU pulse 320 occurs on the fifth clock of the end op word execution cycle. The load ALU pulse 320 indicates that the ALU 28 is again loaded on the fifth clock. At this time, bits 8-15 of the high level instruction in the IS register are gated to the right ALU input 51 and the function of the ALU 28 is specified as PASS RIGHT. Thus, on the load ALU pulse 320, the data from bits 8-15 of the high level instruction in the IS register 18 appear at the ALU output 87.

An increment IAR pulse 322, a load L and P pulse 324 and an initialize pulse 326 occur at the sixth clock in the end op word execution cycle. The increment IAR pulse 322 indicates that a control signal is applied to the summer 101 causing it to add the contents of the IL register 95 and the IAR register 97 and to place the result back in the IAR register 97. The load L and P pulse 324 indicates that control signals are applied to the L register 116 and the P register 128 on the sixth clock causing these registers to load. At this time, the data from bits 8-15 of the high level instruction in the IS register 18 appears at the ALU output 87 and is loaded into both the L register and the P register. The initialize pulse 326 indicates that registers of the microprocessor 14 are placed in an initialize condition to accommodate subsequent microinstructions. On the initialize pulse 326, the L2S latch 120, bit 4 of the G register 106, the A register 64 and the B register 82 are reset; bit 0 of the G register is set; the I register 52 is incremented by plus two; and bits 0-3 of the S register 154 are loaded with information in the manner previously described.

During the end op word, the next microinstruction has been selected in accordance with the op code of the high level instruction being executed. As indicated by arrow 328, the control store produces an I-1 word or as indicated by arrow 330, the control store produces an I-2 word, whichever corresponds to the op code of the high level instruction. The I-1 word pulse 332 indicates that the I-1 word begins following the sixth clock of the end op word execution cycle and extends through four clocks. Thus, the I-1 word execution cycle of four clocks is a short cycle relative to the end op word execution cycle. Below the I-1 word pulse 332, there is shown a load CSAR pulse 334 which begins and ends in the first clock of the I-1 word execution cycle. Also shown below the I-1 word pulse 332 are an ALU function pulse 336 and a control word emit pulse 338 which begin on the first clock and extend through the fourth clock of the I-1 word execution cycle.

The load CSAR pulse 334 indicates that the control store address register 164 is loaded on the first clock of the I-1 execution cycle. As indicated in FIG. 2, the address register 164 is loaded by the I-1 word with bits 3–13, 24–26 of the I-1 word. This next address in the I-1 word specifies the address of the first microinstruction of the E-phase.

The ALU function pulse 336 indicates that the function of the ALU 28 is specified as PASS LEFT during the entire four clock cycle of the I-1 word. The control word emit pulse 338 indicates that the CONTROL WORD EMIT signals on data path 184 are applied to the left ALU input 61 during the entire I-1 word execution cycle. The CONTROL WORD EMIT signals correspond to the S field of the I-1 word, bits 28-31 in the output register 166 as best shown in FIG. 3.

The fetch pulse 340 indicates that during the second, third and fourth clocks of the I-1 word execution cycle, the control store 30 fetches the next microinstruction for loading into the output register 166. This microinstruction is the first microinstruction of E-phase as specified by the I-1 word.

The load ALU pulse 342 occurs on the third clock of the I-1 word execution cycle indicating that the ALU is loaded at this time. The CONTROL WORD EMIT signals appear at the left ALU input 61 and the function of the ALU is specified as PASS LEFT. Thus, the CONTROL WORD EMIT signals are produced at the ALU output 87 on the third clock of the I-1 execution cycle.

A load F pulse 344 and a personalize pulse 346 occur on the fourth clock of the I-1 execution word. The load F pulse 344 indicates that the F register 148 is loaded with the data on the ALU output 87 which is the CONTROL WORD EMIT signals. In this manner, the F register 148 contains data for later specifying the function of the ALU 28. The personalize pulse 346 indicates that information is loaded into various registers to personalize the microprocessor for executing known microinstructions that follow this particular I-1 word. The LC field (bit 17) and the S6 field (bit 16) of the I-1 word are applied, respectively, to bit 6 of the G register 106 and bit 6 of the S register 154. Also, bit 7 of the S register 154 is set to one.

The partial pulse 348 immediately following the I-1 pulse indicates that the first cycle of the E-phase of the high level instruction execution immediately follows the I-1 word. The arithmetic or logical operation and the location of all needed operands are internal to the microprocessor for a particular I-1 word. Therefore, it is not necessary to fetch operands from the main store 12 following the execution of an I-1 word.

An I-2 word may also be specified by the op code of a high level instruction. In such case, the I-2 word execution cycle would begin following the sixth clock in the end op word execution cycle and continues for six clocks as indicated by an I-2 word pulse 350. An ALU function pulse 352 and an IS pulse 354 are shown below the I-2 word pulse 350, both of which begin on the first clock and extend through the third clock of the I-2 word execution cycle. The ALU function pulse 352 indicates that for the first three clocks of the I-2 word execution cycle, the function of the ALU 28 is specified as PASS RIGHT. The IS pulse 354 indicates that for the first three clocks of the I-2 word execution cycle, bits 0–3 of the second half word of the high level instruction in the IS register 18 are selected and gated to the right ALU input 51.

A load ALU pulse 355 occurs on the second clock of the I-2 word execution cycle. The function of the ALU 28 has been specified as PASS right and bits 0–3 of the second halfword of the high level instruction in the IS register 18 are gated to the right ALU input 51. Thus, on the load ALU pulse 355, the data from bits 0–3 of the second halfword of the high level instruction in the IS register 18 appear at the ALU output 87.

A load CSAR pulse 356 and a load P pulse 358 occur on the third clock of the I-1 word execution cycle. The load CSAR pulse 356 indicates that the control store address register 164 is loaded by the next address logic 162 with an address specified with bits 6–9 of the I-2 word. In this manner, the I-2 word chooses one of a plurality of operand fetch routines stored in the control store 30. The load P pulse 358 indicates that the P register 128 is loaded with data corresponding to bits 0–3 of the second half word of the high level instruction in the IS register 18 where appears at the ALU output 87.

A fetch microinstruction pulse 360, an ALU function pulse 362 and a control word emit pulse 364 begin on the fourth clock and extend through the sixth clock of the I-2 control word execution cycle. The fetch first microinstruction pulse 360 indicates that the first microinstruction of the operand fetch routine chosen by the I-2 word is fetched from control store 30 for loading into the output register 166 during the last three clocks of the I-2 word execution cycle. The ALU function pulse 362 indicates that the function of the ALU 28 is specified as PASS LEFT during clocks 4–6 of the I-2 cycle. The control word emit pulse 364 indicates that the CONTROL WORD EMIT signals are produced on data path 184 and applied to the left ALU input 61 during clocks 4–6 of the I cycle.

A load ALU pulse 355 occurs on the fifth clock of the I-2 word execution cycle. Pulse 355 indicates that the CONTROL WORD EMIT signals appearing at the left ALU input 61 are loaded into the ALU 28 and are produced on the ALU output 87.

A right LSR and load L pulse 366 and a personalize pulse 368 occur on the sixth clock of the I-2 word execution cycle. The pulse 366 indicates that the LSR emit field of the I-2 word, bits 16–27, are written into the local store array 138. This data is an E-phase address and will later be used to determine the first microinstruction to be executed during the E-phase. The pulse 366 also indicates that the L field of the I-2 word, bits 29–31, is loaded into the L register 116 in the manner previously described. The personalize pulse 368 indicates that the microprocessor is personalized by the I-2 word to accommodate subsequently executed microinstructions. The LC field of the I-2 word, bit 28, is loaded into bit 6 of the G register 106.

After the completed execution cycle of the I-2 word, an operand fetch routine as specified by the I-2 word, begins execution. A partial pulse 370 indicates that the first cycle of an operand fetch routine follows the I-2 word execution cycle, the plurality of crosses 372 indicate that the operand fetch routine may include a plurality of microinstruction execution cycles.

Following the operand fetch routine, a return word is executed in a six clock period as indicated by a return pulse 374. An LSR pulse 376 begins on the first clock and extends through the third clock of the return word execution cycle. The pulse 376 indicates that the E-phase address previously stored in the local store array 138 by the I-2 word is gated through the ALU 28 to the next address logic 162.

An ALU function pulse 377 begins on the first clock and extends through the sixth clock of the return word execution cycle. This pulse indicates the function of the ALU 28 is specified as PASS LEFT. A load ALU pulse 379 occurs on the second clock to indicate that the E phase address applied to the left ALU input 61 is loaded into the ALU and appears on the ALU output 87.

A load CSAR pulse 387 occurs on the third clock of the return word execution cycle to indicate that the control store address register 164 is loaded at that time. The address loaded into the address register 164 corresponds to the E-phase address that was transmitted from the local store array 138. This address selects a microroutine for implementing the mathematical or logical operation specified by the op code of the high level instruction presently executing in the microprocessor.

A fetch first microinstruction pulse 380 begins on the fourth clock and extends through the sixth clock of the return word execution cycle. The pulse 380 indicates that during clocks 4-6 of the return word execution cycle, the first microinstruction of the E-phase is fetched from the control store 30 for loading into the control store output register 166. A partial pulse 382 follows the return pulse 374 to indicate that the first cycle of the E-phase of the high level instruction execution follows the return word execution cycle.

In the preceding discussion, it has been stated that the microprocessor is initialized during the end op word and personalized during the I-1 or I-2 word to place the microprocessor in a condition to facilitate the execution of subsequent microinstructions. To illustrate how execution time and control words are saved by the present invention, an operand fetch routine is described in conjunction with a flow chart shown in FIG. 5. An operand fetch routine is specified by and follows an I-2 word.

Figure 5:
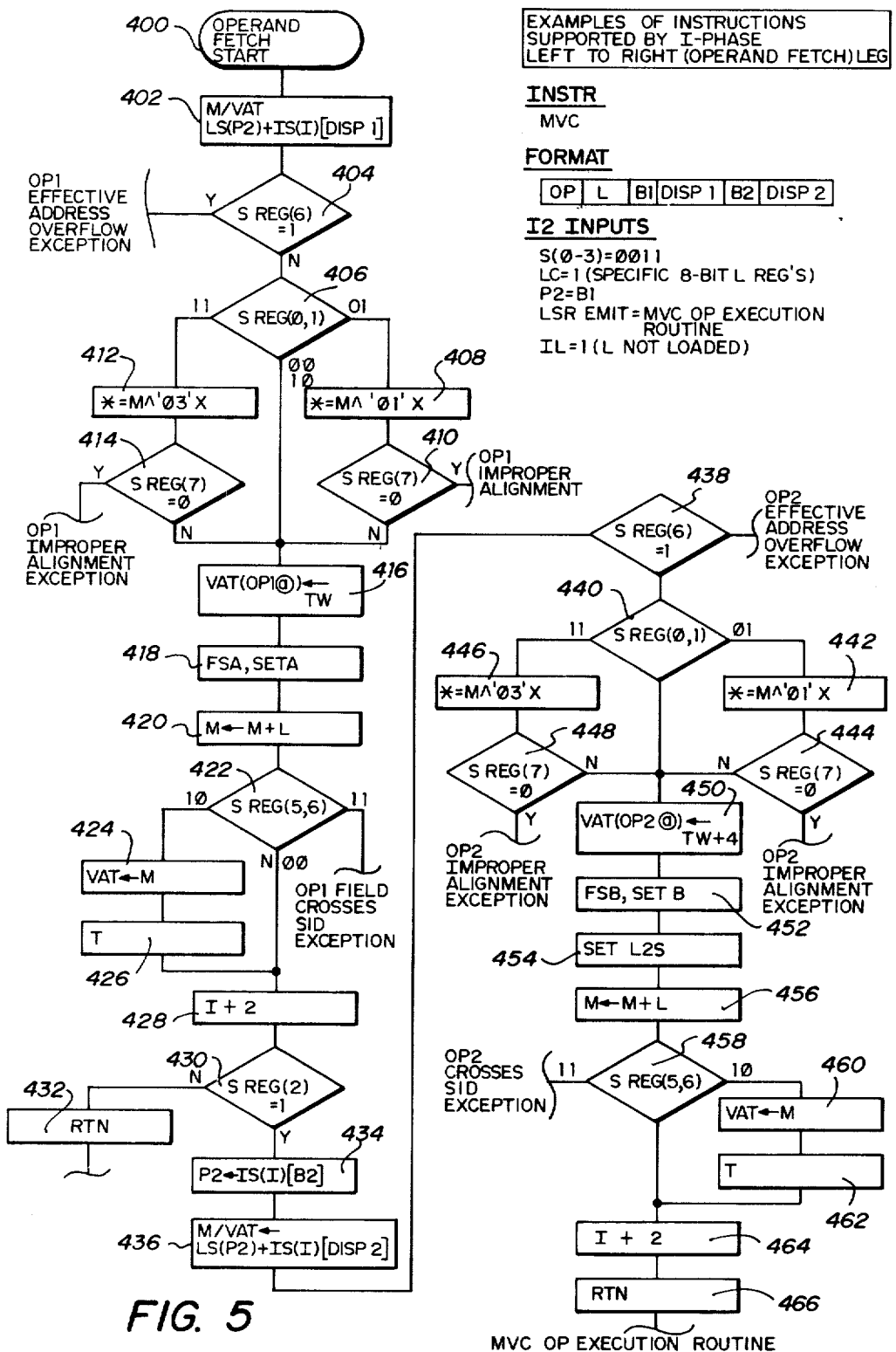
FIG. 5 is a flow chart illustrating the savings of execution time and control words realized in the present invention.

Referring now to FIG. 5, a flow chart is shown for an operand fetch routine which is used to perform I-phase functions for high level instructions which have the following characteristics: 4 or 6 bytes long, containing one or more storage operands; storage operands may or may not be required to start on integral storage boundaries (ie HW or FW); storage operands are processed left- to-right as opposed to right-to-left; operand lengths may be implied by the high level instruction op code (eg Add Fulword), may both be the same and specified by an 8-bit L field in the instruction or may both be different and specified by two 4-bit L1, L2 fields in the instruction. A particular example is shown wherein an MVC (MOVE CHARACTERS) instruction for moving data from a position indicated by a first operand. A first operand address includes a B1 field and a DISP1 field, and a second operand address includes a B2 field and a DISP2 field. The IL field of the I-2 word has a value of "one" which caused the L register 116 not to be loaded. The L register will retain the data which was loaded onto this register by the end op word. The I-2 word will load bits 0-3 of the S register 154 with 0011. The LC field of the I-2 word has a value of "one" indicating that the L register 116 will function as a single 8-bit register. Bits 4-7 of the P register 128 are loaded with the B1 field from the MVC high level instruction.

The LSR emit field of the I-2 word specifies the MVC operation.

In FIG. 5, the operand fetch start block 400 indicates the beginning of an operand fetch routine following the execution of an I-2 word. In the next block 402, the local store array 138 is addressed using the contents of bits 4-7 of the P register (P2) 128 to select a location in the local store array 138. The data selected from the local store array 138 is added to the DISP1 field in the IS register 18 which is pointed to by the I register 52. After the data has been added, the results are placed into the M register 84 and in the virtual address translator 10. The results of the adding should correspond to the address of the first operand in the main store 12. It should be noted that the B1 field had been loaded into bits 4-7 in the P register 128 during the I-2 word. Thus, it was not necessary to use execution time during the operand fetch routine to transfer the B1 field to another register for addressing the local store array 138.

In the next step 404, the value in bit 6 of the S register 154 is checked to determine whether it is equal to one. If the answer is yes, an overflow has occurred and an OP1 effective address overflow exception is indicated. If the answer is no, the operand fetch routine continues. The next step 406 indicates a check of bits 0 and 1 in the S register 154. The I-2 word in the present case loaded these bits with 00. If these bits contain the value 00 or 10, the routine continues to step 416. If the value in these bits had been 01 or 11, an alignment check is performed. If a 01 had been placed in bits 0 and 1 of the S register 154, then the routine goes to step 408 and a logical "AND" operation is performed with the OP1 effective address in the M register 84 against a binary mask of "01"X. In the next step 410, the value of bit 7 in the S register 154 is checked to determine if it is equal to 0. If the answer is yes, an improper alignment is detected and an OP1 improper alignment exception is indicated. If not, the fetch routine returns to step 416.

If in step 406, the bits 0 and 1 of the S register 154 contain 11, a logical AND operation is performed with the OP1 effective address in the M register 84 "ANDED" against a binary mask of "03"X. Then, in step 414, bit 7 of the S register 154 is again checked to determine if it is 0. If the answer is yes, an improper alignment exception is indicated. If the answer is no, the routine continues to step 416. Bits 0-3 of S register 154 were loaded during the I-2 word to specify what type of alignment check was to be performed. Thus, there is no need to use execution time during the operand fetch routine to determine what kind, if any, of alignment check should be performed.

In step 416, a command is issued to the virtual address translator 10 instructing it to perform a translation of the address that had been previously supplied in step 402. Then, in step 418, a command is given to fetch the operand located at the translated address and load it from the main store 12 into the SA-L1 register 20. Also, this step sets the A register 64 to point to the desired byte in the SA-L1 register 20.

In step 420, the contents of the M register 84 and the L register 116 are added and the result is placed in the M register 84. Since the M register 84 previously held the address of one end of the first operand and the L register 116 contained the length $-1$ of the operand, the new result in the M register 84 is the address of the other end of the first operand.

In step 422, bits 5 and 6 of the S register 154 are checked to determine if the operand field crosses a SID boundary in the main store 12. If bits 5 and 6 of the S register 154 contain a value of 11, the operand field crosses a SID boundary and an exception is indicated. If bits 5 and 6 contain a value of 10 (indicating that the operand field crosses a page boundary), then in the next step 424, the value of the M register 84 is moved to the virtual address translator 10. In step 426, a translation is performed in the virtual address translator 10 to determine the address of the other end of the first operand. The next step after step 426, or after step 422, when bits 5 and 6 of the S register 154 contains 00, is step 428. The I register 52 is incremented by two in step 428, causing the I register to point to the next half word in the IS register 18. It will be recalled that the IS register 18 appears as it it is an 8-byte register.

In the next step 430, bit 2 of the S register 154 is checked. The I-2 word loaded the value of 1 into bit 2 of the S register 154 so that the answer to step 430 is yes and the routine continues. However, if a zero had been loaded into bit 2 of the S register 154, the "no" alternative of step 430 would cause the issuance of the return word and the microprocessor would load the first E-phase address into the control store address register 164 to begin E-phase. Where a particular operation required fetching of only one operand, the I-2 word would specify bit 2 of the S register 154 as zero. Thus, the fetch routine efficiently determines the number of operands to be fetched using data in the S register 154 that was personalized by the I-2 word.

In the next step 434, bits 4–7 of the P register 128 are loaded with the value in the B2 field of the high level instruction which is located in the IS register 18. Then, in step 436, the data in bits 4–7 of the P register 128 is used to indirectly address the local store array 138 and retrieve data which is added to the displacement 2 field of the high level instruction. The DISP2 field is located in the IS register 18 and is pointed to by the I register 52. The result of the addition is then loaded into the M register 84 and is also transmitted to the virtual address translator 10.

From this point on, a second operand is fetched from the main store 12 in a manner similar to that described in conjunction with the first (left) column of the flow chart shown in FIG. 5. Step 438 checks bit 6 of the S register 154 for an effective address overflow in the same manner as in step 404. Step 440 corresponds to step 406 and determines what type of alignment check will be performed. Steps 442, 444, 446 and 448 correspond to steps 408, 410, 412 and 414 and perform an identical alignment check.

Step 450 corresponds to step 416 and causes a translation to occur in the virtual address translator 10. In step 452, the second operand is fetched from the main store 12 and loaded into the SB-L1 register 24, and the B register 82 is set to point to the desired byte in the fetched operand.

In step 454, the L2S latch 120 is set to a desired value. In step 456, the address stored in the M register 84 is added to the operand length in the L register 116 to determine the address of the other end of the second operand. The result of the addition is placed in the M register 84. If the L register 116 had been uncoupled, the value placed in the L2S latch 120 in step 454 would determine which data field in the L register is used in step 456.

In step 458, a check is made to determine whether the second operand field crossed over a boundary in the main store 12. This step corresponds to step 422. Steps 460, 462 and 464 correspond identically to steps 424, 426 and 428. Finally, in step 466, a return word is executed to fetch the address of the first E-phase microinstruction. After step 466, the mathematical or logical operation specified by the MVC instruction is performed.

From the foregoing detailed description, it will be appreciated that the computer design of the present invention provides numerous advantages including flexibility for adapting to changed high level instructions and efficient performance. The personalization and initialization of the microprocessor performed by logic during the end op, I-1, and I-2 words results in a substantial savings of control words in subsequent routines. Although the particular embodiment has been described in the foregoing detailed description, it will be understood that the invention is capable of numerous rearrangements, modifications and substitutions of parts without departing from the spirit of the invention.

I claim:

1. In a computer wherein high level instructions are fetched from a main store for execution in a microprocessor, the high level instructions including operation information specifying an operation to be performed in the microprocessor, an I-fetch control system comprising:

a control store for holding a plurality of microinstructions for use in executing the high level instructions in the microprocessor and for producing first microinstructions after the complete execution of each high level instruction;

a plurality of support registers controlled by the microinstructions for storing information for use in the execution of a high level instruction, at least one of said support registers being initialized by the first microinstruction to facilitate the subsequent execution of any of the high level instructions and at least one other of said support registers being personalized by the first microinstruction to facilitate the execution of a selected high level instruction being executed in the microprocessor, a first communication path between the main store and said control store; and means responsive to the first microinstruction for gating the operation information of a particular high level instruction through said communication path to said control store to select the next microinstruction to be executed in the microprocessor.

2. The I-fetch control system of claim 1 further comprising:

a local store for containing operands and data for use during the execution of a high level instruction;

said support register including a P register for use in addressing said local store, the first microinstruction loading said P register with data from the high level instruction being executed to place said P register in a personalized condition, whereby high level instruction execution is facilitated by eliminating the need to load said P register before the first subsequent use thereof.

3. The I-fetch control system of claim 1 wherein one of said support registers comprises an L register, said first microinstruction loading said L register with data from the high level instruction being executed to specify the length of an operand in main store.

4. The I-fetch control system of claim 1 further comprising:

said control store being responsive to the operation information to produce a subsequent microinstruction corresponding to the operation information received by said control store; and at least one of said support registers being loaded with information by the subsequent microinstruction to place said support registers in a personalized condition to facilitate the subsequent execution of the particular high level instruction being executed in the microprocessor.

5. The I-fetch control system of claim 4 wherein said control store is operable to produce E-phase microinstructions after the execution of the subsequent microinstruction to begin an arithmetic or logical operation in the microprocessor corresponding to the operation information of a high level instruction being executed in the microprocessor.

6. The I-fetch control system of claim 1 further comprising:

said control store being responsive to the operation information to produce a subsequent microinstruction corresponding to the operation information received by said control store;

said control store holding a plurality of operand fetch microroutines at spaced apart memory locations within said control store;

an address register disposed in said first communication path and connected for addressing said control store, said address register being loaded with an operand fetch routine address by the subsequent microinstruction to select one of the operand fetch microroutines; and said control store being operable to produce the selected operand fetch microroutine to cause the computer to fetch information from the main store for use in executing the particular high level instruction being executed in the microprocessor.

7. The I-fetch control system of claim 1 further comprising:

said control store being responsive to the operation information to produce a subsequent microinstruction corresponding to the operation information received by said control store, the subsequent microinstruction including an E-phase address and an operand fetch routine address;

said control store holding a plurality of operand fetch routines at spaced apart memory locations within the control store;

an address register forming part of said first communication path and connected to address said control store for determining the next microinstruction in the control store to be executed, said address register being loaded with the operand fetch routine address by the subsequent microinstruction to select one of the fetch routines;

a local store for receiving and storing the E-phase address in response to the second microinstruction;

said control store being responsive to the fetch routine address in said address register to produce a fetch routine corresponding to said fetch routine address for fetching information from the main store for use in executing a high level instruction being executed in the microprocessor; and a second communication path connected between said local store and said address register for transmitting the E-phase address after the execution of the fetch routine to load the E-phase address into said address register, whereby an arithmetic or logical operation is specified by the operation information of the high level instruction being executed by the microprocessor is selected and executed.

8. The I-fetch control system of claim 1 further comprising:

said control store being responsive to the operation information to produce a subsequent microinstruction corresponding to the operation information received by said control store;

at least one of said support registers being loaded with information by the subsequent microinstruction to place said support register in a personalized condition to facilitate the subsequent execution of microinstructions corresponding to a particular high level instruction being executed in the microprocessor;

an address register forming part of the first communication path and connected to said control store for determining the next microinstruction in the control store to be executed, said address register being loaded with a fetch routine address by the subsequent microinstruction;

a local store for being loaded by the second microinstruction to hold an E-phase address;

said control store being responsive to the fetch routine address in said address register to produce at least one fetch microinstruction for fetching information from said main store for use in executing a particular high level instruction being executed in the microprocessor; and a second communication path connected between said local store and said address register, the E-phase address held in said local store being transmitted through said second communication path after the execution of the fetch routine to load the E-phase address into said address register for selecting an arithmetic or logical operation routine corresponding to the operation information of the high level instruction being executed in the microprocessor, the arithmetic or logical operation routine being executed by the microprocessor after the execution of the fetch routine.

9. The I-fetch control system of claim 1 further comprising:

said control store being responsive to the operation information to produce a subsequent microinstruction corresponding to the operation information received by said control store, said subsequent microinstruction being selected from a group of microinstructions stored in the control store consisting of a plurality of first type microinstructions and a plurality of second type microinstructions;

at least one of said support registers being loaded with information by the subsequent microinstruction to place said support registers in a personalized condition to facilitate the subsequent execution of a microinstructions corresponding to and necessary for the execution of the particular high level instruction being executed;

said control store being operable to produce E-phase microinstructions subsequent to the execution of the first type microinstructions to begin an arithmetic or logical operation corresponding to the operation information of a high level instruction being executed by the microprocessor;

an address register connected to said control store for determining the next microinstruction held in the control store to be executed, said address register being loaded with a fetch routine address by the second type microinstructions;

a local store for being loaded by the second type microinstructions to hold an E-phase address;

said control store being responsive to the fetch routine address in said address register to produce a fetch routine for fetching information from said main store for use in executing a particular high level instruction being executed in the microprocessor; and a second communication path connected between said local store and said address register, the E-phase address held in said local store being transmitted through the second communication path after the execution of the fetch routine to load the E-phase address into said address register for selecting an arithmetic or logical operation routine corresponding to the operation information of the high level instructions being executed by the microprocessor.

10. An I-fetch control system for use in a computer including a main store for storing information including high level instructions and operands, the high level instructions each including an operation code specifying an arithmetic or logical operation to be performed by the computer, the computer being operable to execute the high level instructions in two phases including an I-phase wherein decoding of the high level instructions and execution of preliminary operations occur and including an E-phase wherein execution of the arithmetic or logical operation specified by the operation code occurs, said I-fetch control system comprising:

a control store for holding a plurality of control instructions for use in executing the high level instructions, the control instructions including a separate personalize control instruction corresponding to and identified with each operation code in the high level instructions;

logic means for selecting a personalize control instruction in said control store corresponding to the operation code of the particular high level instruction being executed in the computer, the selected personalize control instruction being produced by said control store; and said logic means being responsive to the selected personalize control instruction to place the computer in a personalized condition for execution of the particular high level instruction being executed in the computer.

11. The I-fetch control system of claim 10, wherein said logic means are operable to select the first control instruction to be produced by the control store in the E-phase of the execution of a particular high level instruction in accordance with information contained in the personalize control instruction.

12. The I-fetch control system of claim 10 further comprising:

a plurality of support registers for holding information for use in the execution of a user instruction; and said logic means being operable to load information into at least one of said support registers in response to the personalize control instruction to place said support register in a personalized condition to facilitate the subsequent execution of a particular high level control instruction being executed.

13. The I-fetch control system of claim 10 wherein:

said control store is operable to store and selectively produce fetch routines for fetching operands from the main store; and said logic means is responsive to the personalize control instruction to select one of the fetch routines for execution.

14. The I-fetch control system of claim 10 further comprising:

a local store communicating with said logic means for storing information for utilization during the execution of a high level instruction;

said control store being operable to store a plurality of fetch routines for fetching operands from the main store;

said logic means being responsive to the selected personalize control instruction to load an E-phase address into the local store and to supply a fetch routine address to the control store to select one of the plurality of fetch routines;

said control store being operable to produce the selected fetch routine in response to the fetch routine address for subsequent execution; and said logic means being operable after the complete execution of the selected fetch routine to gate the E-phase address from said local store to select a control instruction to begin the E-phase of the execution of the high level instruction.

15. The I-fetch control system of claim 10 further comprising:

said logic means being operable in response to the operation code to select one of a plurality of personalize control instructions stored in the control store and to cause the control store to produce the selected control instruction, said personalize control instructions consisting of personalize control instructions of a first type and personalize control instructions of a second type;

a plurality of support registers for storing data for use in executing high level instructions;

said logic means being responsive to the personalize control instruction of the first type to load information into at least one of said support registers to place the support register in a personalized condition to facilitate the subsequent execution of a particular high level instruction being executed and to supply an E-phase address to said control store to begin the E-phase of the execution of the particular high level instruction being executed;

a local store communicating with said logic means for storing information for utilization during the execution of high level instructions;

said logic means being responsive to the personalize control instructions of the second type to load an E-phase address into the local store, to supply a fetch routine address to the control store, and to load information into at least one of said support registers to place said support register in a personalized condition to facilitate the execution of a selected high level instruction being executed;

said control store holding a plurality of fetch routines at spaced apart memory locations and being responsive to the fetch routine address to produce one of the fetch routines for fetching at least one operand from the main store; and said logic means being operable after the completion of the selected fetch routine to gate the E-phase address from said local store to said logic means for use in building an address to select a control instruction to begin the E-phase of a high level instruction being executed.

16. A control system for use with a processor wherein high level instructions specifying an operation to be performed in the processor and operands are fetched from a main store for use in the processor, comprising:

a control store for storing a plurality of operand fetch routines at spaced apart memory locations, each of the operand fetch routine memory locations being noncontiguous with each of the other operand fetch routine memory locations, said control store further storing a plurality of fetch control words corresponding to a predetermined group of the operations specified by the high level instructions; said control store producing a fetch control word corresponding to the operation specified by a presently executing high level instruction; and logic means responsive to the fetch control word produced by said control store to build an address identifying one of the operand fetch routines stored in said control store and for applying the address to the control store to select the identified operand fetch routine for fetching an operand from the main store.

17. The control system of claim 16 wherein said logic means comprises:

a decode unit connected to said control store for decoding data produced by said control store and for producing an activation signal in response to the fetch control word; and a selector responsive to the activation signal to build the address from a predetermined field of the fetch control word and to selectively apply the address to said control store to select the identified operand fetch routine.

18. The control system of claim 17 further comprising a control store address register being selectively gated to receive the address for selecting the identified operand fetch routine.

19. The control system of claim 18 wherein:

said control store address register includes a plurality of bits located in the middle portion of said control store address register, said bits being connected to the control store for use in selecting the plurality of spaced apart memory locations holding the operand fetch routine; and said selector being operable to gate data from the predetermined field of the fetch control word to the plurality of bits.

20. In a computer wherein a microprocessor is responsive to a high level instruction to perform an operand fetch routine which is common to a multiplicity of high level instructions, each of the high level instructions including an operation code specifying an operation to be performed by the microprocessor, an I-fetch control system comprising:

a control store for storing a plurality of control words and microroutines and for producing a return word after the completion of an operand fetch routine wherein a plurality of control words are executed producing commands that are transmitted to the main store to fetch operands therefrom;

a format decode unit connected to receive data from said control store and for recognizing the return word, said format decode unit being responsive to the return word to produce a gate local store signal; and a local store for holding address data corresponding to an operation code included in a presently executing high level instruction during the performance of the operand fetch routine and for gating the address data to said control store in response to the gate local store signal for selecting a microroutine to implement the operation specified by the operation code.

21. The control system of claim 20 further comprising a selector, the address data from said local store being gated to said control store through said selector, said selector being responsive to the return word to build an address including the address data from said local store and to apply the address to said control store to select a microroutine for implementing the operation specified in the operation code.

22. A control system for use in a computer having a main store for storing operands and high level instructions, the high level instructions including an operation code for specifying an arithmetic or logical operation to be performed by an arithmetic logic unit in a processor during the execution of a high level instruction, said control system comprising:

a control store for storing a plurality of control words for controlling operation of the processor, said control store producing an end operation word following the execution of a previous high level instruction to begin the execution of a next high level instruction;

a format decode connected to receive data from said control store and operable to recognize the end operation word to produce a format EO signal in response to the end operation word;

a destination decode unit for recognizing the format EO signal and for producing a P signal and an L signal in response to the format EO signal;

an L register connected for receiving the L signal and being gated thereby to receive length data from a predetermined field of the next high level instruction, the length data corresponding to the length of an operand in main store; and a P register for being gated by said P signal to receive data from the next high level instruction.

23. The control system of claim 22 further comprising a status control unit for producing initializing signals to place the processor in an initialized condition in preparation for executing any high level instruction.

24. A control system for use in a computer having a main store for storing operands and high level instructions, the high level instructions including an operation code for specifying an arithmetic or logical operation to be performed by an arithmetic logic unit in a processor during the execution of a high level instruction, said control system comprising:

a control store for storing a plurality of control words for controlling operation of the processor, said control store producing one of a plurality of I-1 words in response to the operation code of a predetermined group of high level instructions, each of the I-1 words including an F field specifying an arithmetic operation to be performed in the microprocessor and including a next address field specifying the control word to be produced by the control store after execution of the I-1 word;

a format decode unit connected for receiving data from said control store, for distinguishing an I-1 word from other control words and for producing a format I-1 signal in response to the I-1 word;

a destination register decode unit connected for receiving signals from said format decode unit, for distinguishing an I-1 format signal from other signals and for producing an F signal in response to the format I-1 signal;

an F register for indirectly specifying the mathematical operation to be performed by the arithmetic logic unit, said F register being gated by the F signal to receive data corresponding to the F field in the I-1 word specifying an arithmetic operation; and a selector responsive to the format I-1 signal for gating the next address field of the I-1 word to said control store for selecting the next control word to be produced.

25. A control system for use in a computer having a main store for storing operands and high level instructions, the high level instructions including an operation code for specifying an arithmetic or logical operation to be performed by an arithmetic logic unit in a processor during the execution of a high level instruction, said control system comprising:

a control store for storing a plurality of control words including I-2 words for controlling the operation of the processor, said control store producing one of a plurality of I-2 words in response to the operation code of a predetermined group of high level instructions, the I-2 words including an LSR emit data field specifying an address in control store;

a format decode unit connected for receiving data from said control store, for distinguishing the I-2 word from other control words and for producing a format I-2 signal in response to the I-2 word;

a destination register decode unit connected for receiving signals from said format decode unit, for distinguishing a format I-2 signal from other signals and for producing an LSR signal in response to the format I-2 signal;

a source decode unit connected for receiving data from said control store and for receiving signals from said format decode unit, said source decode unit being operable to produce a control word emit signal in response to the format I-2 signal, the control word emit signal including the LSR emit data field of the I-2 word; and a local store array for being gated by the LSR signal to receive and store the LSR emit data field from the control word emit signal for subsequent use in building the address of the first control word necessary for performing the operation specified by the operation code of the presently executing high level instruction.

26. The control system of claim 25 further comprising:

the I-2 word including an L data field specifying the length of an operand in main store;

the control word emit signal including the L data field of the I-2 word;

said destination register decode unit being operable to produce an L signal in response to the format I-2 signal; and an L register for being gated by the L signal to be loaded with the L data field from the control word emit signal.

27. The control system of claim 25 further comprising:

said destination register decode unit being operable to produce P signals in response to the format I-2 signal;

a P register for performing an indirect addressing function;

said source decode means being responsive to the format I-2 signal to gate a predetermined data field from the presently executing high level instruction to said P register; and said P register being gated by the P signal to load said predetermined field into said P register.

* * * * *